(12) United States Patent
Vyas et al.

(10) Patent No.: US 12,211,189 B2
(45) Date of Patent: Jan. 28, 2025

(54) SYSTEMS AND METHODS FOR LIGHTWEIGHT MACHINE LEARNING FOR IMAGE ILLUMINATION CONTROL

(71) Applicant: Samsung Electronics Company, Ltd., Suwon-si (KR)

(72) Inventors: Kushal Kardam Vyas, Santa Clara, CA (US); Kathleen Sofia Hajash, Sunnyvale, CA (US); Abhijit Balaji, Dallas, TX (US); Sajid Hassan Sadi, San Jose, CA (US); Jihee Kim, Mountain View, CA (US); Hanna Fuhrmann, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/856,693

(22) Filed: Jul. 1, 2022

(65) Prior Publication Data
US 2023/0289930 A1    Sep. 14, 2023

Related U.S. Application Data

(60) Provisional application No. 63/318,638, filed on Mar. 10, 2022.

(51) Int. Cl.
*G06T 5/92*     (2024.01)
*G06T 3/40*     (2024.01)
(Continued)

(52) U.S. Cl.
CPC ................. *G06T 5/92* (2024.01); *G06T 3/40* (2013.01); *G06T 15/506* (2013.01); *G06T 17/20* (2013.01);
(Continued)

(58) Field of Classification Search
CPC ... G06T 5/92; G06T 3/40; G06T 2207/10024; G06T 5/94; G06T 2207/20084; G06T 15/506; G06V 10/60; G06V 40/168
See application file for complete search history.

(56) References Cited

U.S. PATENT DOCUMENTS

| 10,248,844 | B2 | 4/2019 | Kim |
| 10,565,686 | B2 | 2/2020 | Lehtinen |

(Continued)

FOREIGN PATENT DOCUMENTS

| CN | 104008364 A | 8/2014 |
| CN | 109190521 A | 1/2019 |

(Continued)

OTHER PUBLICATIONS

Tsai, Yun-Ta, et al., Portrait Light: Enhancing Portrait Lighting with Machine Learning, Google AI Blog, https://ai.googleblog.com/2020/12/portrait-light-enhancing-portrait.html, 7 pages, Dec. 11, 2020.

(Continued)

*Primary Examiner* — Bobbak Safaipour
*Assistant Examiner* — Michael Kim Maiden

(57) ABSTRACT

In one embodiment, a method includes accessing an input image associated with an initial illumination, extracting from the input image at least a first, a second, and a third mono-channel images based on a first, a second, a third image channel, respectively, determining a first, a second, and a third correction for the first, second, and third mono-channel images with a first, a second, and a third correction algorithm, respectively, generating a first, a second, and a third corrected mono-channel image by applying the first, second, and third correction to the first, second, and third mono-channel image, respectively, and generating an output corrected image corresponding to the input image based on the first, second, and third mono-channel corrected images, wherein the output corrected image is associated with a (Continued)

corrected illumination with respect to the initial illumination.

23 Claims, 30 Drawing Sheets

(51) Int. Cl.
  *G06T 15/50* (2011.01)
  *G06T 17/20* (2006.01)
  *G06V 40/16* (2022.01)
(52) U.S. Cl.
  CPC .. *G06V 40/168* (2022.01); *G06T 2207/10024* (2013.01); *G06T 2207/20084* (2013.01)

(56) References Cited

U.S. PATENT DOCUMENTS

| | | | |
|---|---|---|---|
| 10,692,265 | B2 | 6/2020 | Hadap |
| 10,740,959 | B2 | 8/2020 | Johnson |
| 10,936,909 | B2 | 3/2021 | Sunkavalli et al. |
| 11,978,181 | B1* | 5/2024 | Pieper .................. G06T 11/001 |
| 2020/0015575 | A1 | 1/2020 | Fu |
| 2020/0143230 | A1 | 5/2020 | Su |
| 2020/0273237 | A1 | 8/2020 | Sunkavalli et al. |
| 2020/0311878 | A1 | 10/2020 | Matsuura |
| 2020/0320748 | A1 | 10/2020 | Levinshtein et al. |
| 2020/0410270 | A1 | 12/2020 | Naruse et al. |
| 2021/0264576 | A1 | 8/2021 | Sun |
| 2022/0014684 | A1* | 1/2022 | Zhou .................. H04N 23/632 |
| 2022/0027659 | A1 | 1/2022 | Legendre |
| 2022/0067450 | A1 | 3/2022 | Verma |
| 2022/0101596 | A1 | 3/2022 | Volkov |
| 2022/0155232 | A1 | 5/2022 | Liu |
| 2022/0157012 | A1 | 5/2022 | Ghosh |

FOREIGN PATENT DOCUMENTS

| | | |
|---|---|---|
| CN | 107909640 B | 7/2020 |
| CN | 111798384 A | 10/2020 |
| CN | 112052703 | 12/2020 |
| CN | 112132743 A | 12/2020 |
| CN | 113240622 A | 8/2021 |
| CN | 112131975 A | 11/2022 |
| JP | 2023039499 | 3/2023 |
| KR | 10-2022-0001417 A | 1/2022 |
| WO | WO 2022-099322 A1 | 5/2022 |

OTHER PUBLICATIONS

Gharbi, Michael, et al., "Deep Bilateral Learning for Real-Time Image Enhancement," Siggraph 2017, ACM Transactions on Graphics, vol. 36, No. 4, Article 118. Publication date: Jul. 2017, 0730-0301/2017/7-ART118, DOI: http://dx.doi.org/10_1145/3072959.3073592, https://groups.csail.mit.edu/graphics/hdrnet/data/hdrnet.pdf, 12 pages, Jul. 20, 2017.
Apple Support, "Use Portrait mode on your iPhone," https://support.apple.com/en-us/HT208118, 4 pages, Oct. 5, 2021.
Sengupta, Soumyadip, et al., "SfSNet: Learning Shape, Reflectance and Illuminance of Faces in the Wild," https://arxiv.org/pdf/1712.01261.pdf, arXiv:1712.01261v2 [cs.CV], 23 pages, Apr. 19, 2018.
Sengupta, Soumyadip, et al. "A Light Stage on Every Desk," Submitted on May 17, 2021 (v1), last revised Nov. 11, 2021 (this version, v2), arXiv:2105.08051v2 [cs,CV]2105.08051, https://arxiv.org/pdf/2105.08051.pdf, 25 pages, Nov. 11, 2021.
Pandey, Rohit, et al., "Total Relighting: Learning to Relight Portraits for Background Replacement," ACM Transactions on Graphics, vol. 40, Issue 4, Aug. 2021 (Online: Jul. 19, 2021), Article No. 43, https://doi.org/10.1145/3450626.3459872, https://augmentedperception.github.io/total_relighting/total_relighting_paper.pdf, pp. 1-21, Jul. 19, 2021.
PCT Search Report and Written Opinion in PCT/KR2023/002924, Jun. 30, 2023.
Mahmoud Afifi, 'Semantic White Balance: Semantic Color Constancy Using Convolutional Neural Network', Feb. 1, 2018.
PCT Search Report and Written Opinion in PCT/KR2023/003323, Jun. 7, 2023.
Deep Single-Image Portrait Relighting—Hao Zhou and Sunil Hadap and Kalyan Sunkavalli and David W. Jacobs; International Conference on Computer Vision (ICCV) 2019, Oct. 2019.
Google Pixel Portrait Light (https://ai.googleblog.com/2020/12/portrait-light-enhancing-portrait.html), Dec. 8, 2022.

\* cited by examiner

Captured Image 210

Expected Image 220

Captured Image 230

Expected Image 240

SYSTEMS AND METHODS FOR LIGHTWEIGHT MACHINE LEARNING FOR IMAGE ILLUMINATION CONTROL

PRIORITY CLAIM

This application claims the benefit under 35 U.S.C. 119 of U.S. Provisional Patent Application No. 63/318,638 filed Mar. 10, 2022.

TECHNICAL FIELD

This disclosure relates generally to image processing, and in particular relates to machine learning for image processing.

BACKGROUND

Smartphones and other camera-based devices today seem to be central to a user's photography experience. However, in many cases the quality of the photograph seems to be dependent on external uncontrollable factors such as bad environment lighting, shadows from foreign objects, strong directional lights, etc., thus making it difficult for the user to capture what the user sees accurately or what the user wants but cannot capture without the proper lighting.

DESCRIPTION OF EXAMPLE EMBODIMENTS

Mobile Client System Overview

Figure 1:
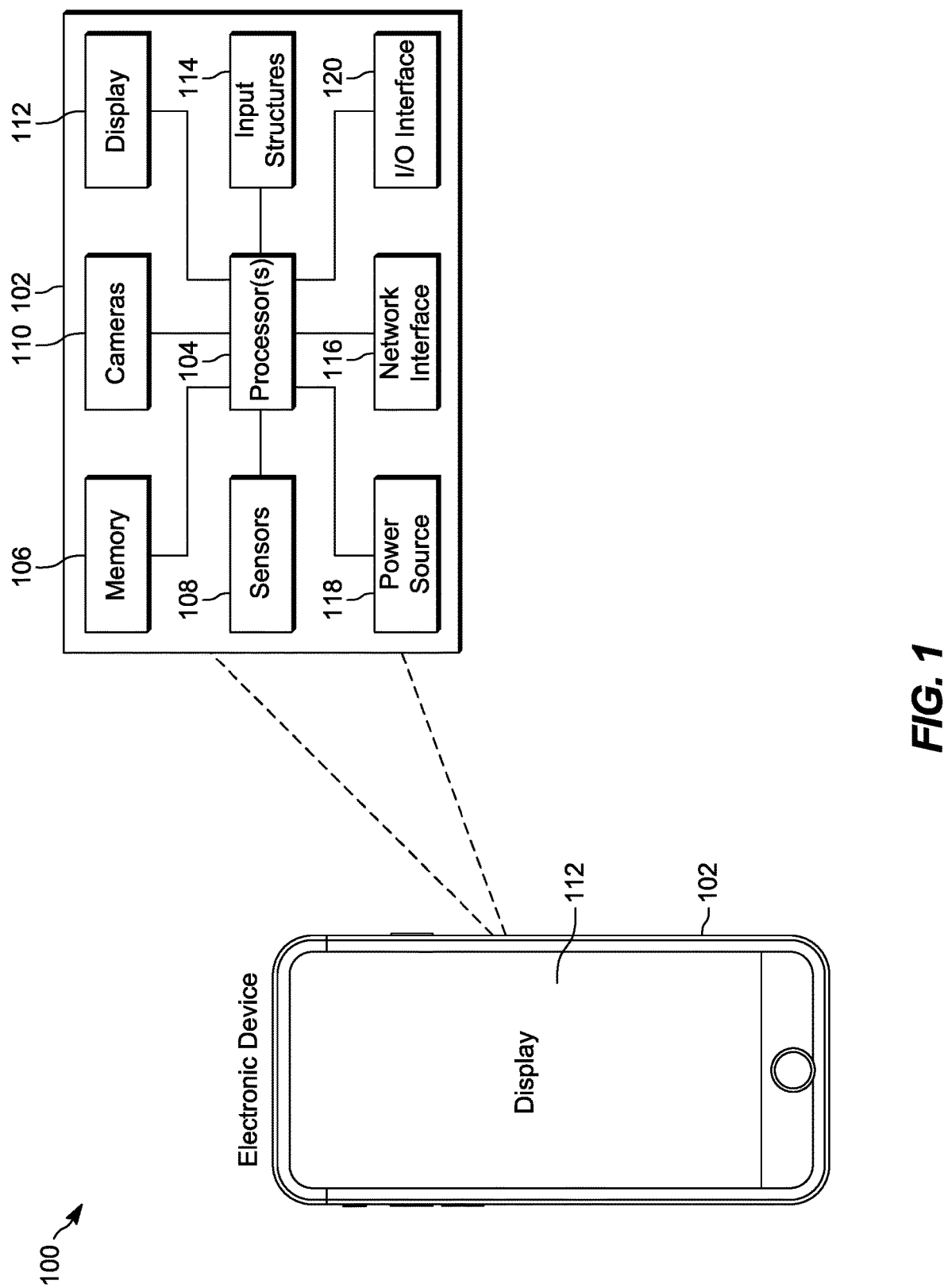
FIG. 1 illustrates an example electronic device.

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Lightweight Machine Learning for Image Illumination Control

Today's smartphone and other camera-based devices may be point-and-shoot camera devices. A user may point such a device at the scene that the user wants to photograph, and an output may be delivered by automatic setting of focusing, exposures, color-corrections, etc. This type of image processing may serve well for simple photography tasks such as portrait photos, HDR photos, and night mode. However, the captured photograph may be dependent not only on the settings of the camera such as focus, exposures, etc. but also environmental/background factors such as poor environment lighting, presence of strong directional lights, occlusion, shadows from foreign objects, motion of the scene, etc. As the complexity of the scene increases, there may be new emphasis on editing the photo to perfection by using photo-editing software, or by trying to control the said environmental/background factors such as lighting by adding external studio fill-lights. In both the said methods, there may be user-intervention in terms of post-capture editing of the image or setting up the scene, which may become counter-intuitive for, e.g., a smartphone camera. There may be a requirement for a smartphone or low-computation camera devices to be able to handle said illumination factors. With recent advances in machine learning and artificial intelligence, one may model, predict, and computationally control the said external factors to enhance the quality of the captured photograph and make it resemble the actual scene in front of the camera. However, a lot of current machine-learning models may require sending data to the cloud or using highly computationally expensive models that are not practical in terms of performance on low-computation devices or even user privacy. There may be a need for lightweight machine-learning models that can quickly output an enhanced image on the smartphone, or any camera-based device.

Figure 2:
FIG. 2 illustrates an example comparison between captured images and expected images.
Figure 2:
Figure 2:
Figure 2:

FIG. 2 illustrate an example comparison between captured images and expected images. The captured images show how poor illumination, shadows, and other environmental lighting conditions may affect an image. Regarding captured image 210, the camera may lack the understanding of illumination and shadows, and hence the captured image 210 has a lot of foreign shadows on the face of the subject. The expected image 220 shows how these shadows/illumination variations can be corrected. Regarding captured image 230, there may be instances where the background has directional light as seen. The camera may be limited by the capturing range of its sensor and fails to yield any (significant) details on the shadowed part of the face. Thus, the expected image 240 shows how these strong directional lights can be corrected while maintaining details in the shadowed regions.

In particular embodiments, an electronic device 100 (e.g., smartphones or other camera-based devices) may use a lightweight machine-learning model for illumination control (e.g., in portraits) for smartphone and other camera-based devices. The electronic device 100 may use machine learning and artificial intelligence to understand the underlying physics of how the light interacts with the subject (e.g., reflectance and scattering of light on the subject) in the photograph. The electronic device 100 may additionally consider color theory such as separation of luminosity and chroma information for an image, and compressibility of chroma information. In particular embodiments, we may leverage the underlying physics and color theory to formulate an efficient neural network (or any suitable model) and the electronic device 100 may then use the neural network to control the interaction of light at an image level by correcting the illumination for images. The lightweight machine-learning model may be capable of running near-real time on the smartphone or low-computation camera device. In particular embodiments, the electronic device 100 may handle a plurality of illumination variations including but not limited to indoor/outdoor illumination variations and foreign shadows. The electronic device 100 may model these illumination variations to correct a photograph taken in poor illumination, including compensating for lost detail in poorly lit regions of the image, recovering the details present in the shadows or over-exposed areas of the image, handling foreign shadows, computationally correcting the photograph as if it was captured in studio lights, or having ambient illumination or a desired illumination, etc. The electronic device 100 may be also able to relight a photograph captured in a particular environment illumination into another environment illumination to create a different type of look on the photograph. As an example and not by way of limitation, relighting the photograph may include computationally editing a photograph captured in ambient light to have artistic/otherwise light effects, or vice versa. As a result, the electronic device 100 may enable the user to take photographs in varying lighting, shadow, or environmental conditions with real-time or near-real time performance.

In particular embodiments, the electronic device 100 may access an input image associated with an initial illumination (e.g., a varying or an uneven illumination). The electronic device 100 may then extract from the input image at least a first mono-channel image based on a first image channel, a second mono-channel image based on a second image channel, and a third mono-channel image based on a third image channel. The electronic device 100 may further determine a first correction for the first mono-channel image with a first correction algorithm, a second correction for the second mono-channel image with a second correction algorithm, and a third correction for the third mono-channel image with a third correction algorithm. In particular embodiments, the electronic device 100 may generate a first corrected mono-channel image by applying the first correction to the first mono-channel image, a second corrected mono-channel image by applying the second correction to the second mono-channel image, and a third corrected mono-channel image by applying the third correction to the third mono-channel image. The electronic device 100 may further generate an output corrected image corresponding to the input image based on the first, second, and third mono-channel corrected images. In particular embodiments, the output corrected image may be associated with a corrected illumination with respect to the initial illumination.

Certain technical challenges exist for image illumination control. One technical challenge may include that current cameras lack an understanding of illumination and shadows, and they are unable to address or correct results from poor illumination, e.g., harsh shadows, backlit face, foreign shadows, etc. In addition, any current methods are considerably slow and cannot run on mobile devices. The solution presented by the embodiments disclosed herein to address this challenge may be modeling the illumination correction for images. We may leverage color theory and physics of how light interacts with surfaces as priors to train a neural network architecture that is lightweight, fast, and preserves high quality details in the image. By using the chroma compressibility, we may design the correction network such that the chroma correction algorithm/network can be smaller/have fewer number of parameters than the luma correction algorithm/network. Another technical challenge may include that there is a lack of simple and efficient data capture and processing systems and a reliance on aligned input and ground truth pairs. One solution presented by the embodiments disclosed herein to address this challenge may be generating a capture and processing pipeline for in-the-wild data for relighting. This may be simple and easy to capture and, in contrast to datasets collected in highly controlled environments, more faithfully represent the distribution of photographs that a user would click in the real world in terms of the level of detail, high quality images, and light variability. Another solution presented by the embodiments disclosed herein to address this challenge may be a novel loss function, called mesh loss, that enables training machine-learning systems with in-the-wild, unaligned data.

Certain embodiments disclosed herein may provide one or more technical advantages. A technical advantage of the embodiments may include modeling different illumination variations to correct a photograph taken in poor illumination, including compensating for lost detail in poorly lit regions of the image, recovering the details present in the shadows or over-exposed areas of the image, handling foreign shadows, computationally correcting the photograph as if it was captured in studio lights, etc. Another technical advantage of the embodiments may include enabling the user to take photographs in varying lighting, shadow, or environmental conditions with real-time or near-real time performance as a lightweight machine-learning model is used for illumination correction, which may be capable to run near-real time on the smartphone or low-computation camera device. Another technical advantage of the embodiments may include relighting a photograph captured in a particular environment illumination into another environment illumination to create a different type of look on the photograph as a user may specify an illumination that is then used for image relighting. Certain embodiments disclosed herein may provide none, some, or all of the above technical advantages. One or more other technical advantages may be readily apparent to one skilled in the art in view of the figures, descriptions, and claims of the present disclosure.

In particular embodiments, to characterize illumination across images, an image may be defined in more intrinsic quantities as follows:

$$I = a \cdot f(N, L) \quad (1)$$

where I indicates a captured image, a indicates the albedo, N indicates the surface normal of the scene, and L may indicate a [3×9]-dimensional lighting vector (9 dimensions for each color channel R, G, and B). In certain embodiments, f (N, L) may be the reflectance function of the object, which may describe how light is reflected, e.g., Lambertian. In alternative embodiments, f (N, L) may be a shading function under the context of shading images. Shading may be defined as the intermediate quantity that resembles the variation of color when light is reflected off a surface in the direction of the camera capturing the image, which is the output of f (N, L). While reflectance is more to do with the object's material characteristics, shading is more to do with the overall appearance of the object while being captured.

Take portrait images as an example use case, we may define the above quantities in terms of portrait images. We assume that every captured image I contains a face on which we compute or predict the above quantities. In particular embodiments, albedo may be defined as the amount of light that has been reflected by the object's surface. f(N, L) may be defined as the Lambertian reflection function or any other reflection function. This may capture how the light incident on an object's surface is reflected away from it. In order to provide a simpler explanation, we may assume f to be Lambertian in nature.

Figure 3:
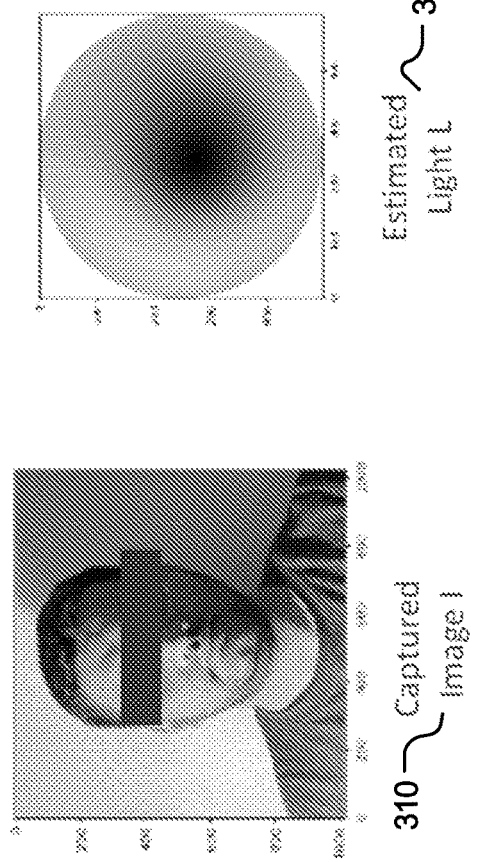
FIG. 3 illustrates an example estimation of lighting.
Figure 4:
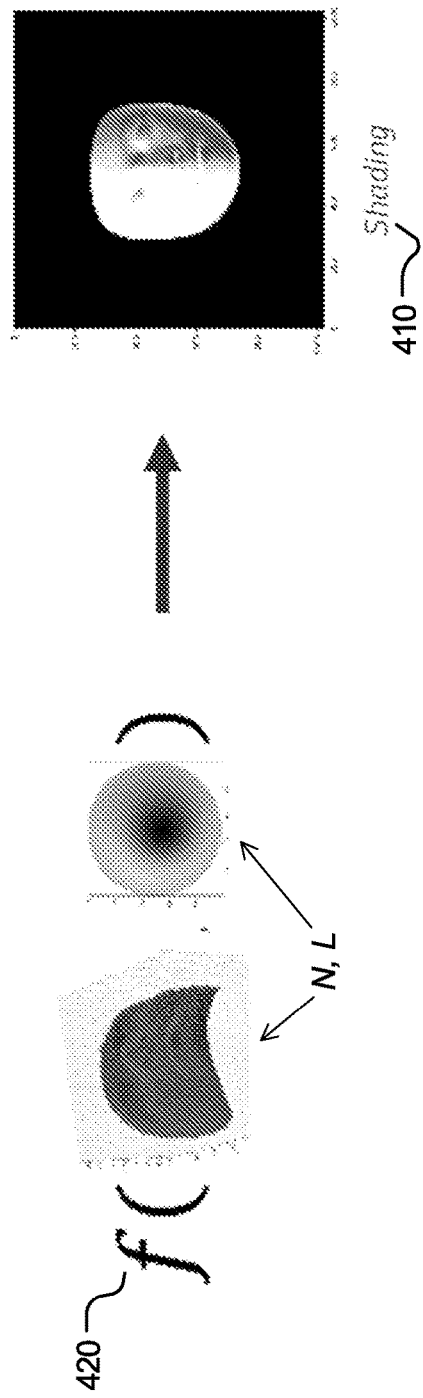
FIG. 4 illustrates an example estimation of shading.

In particular embodiments, each of these quantities may be estimated for the machine-learning model as follows. FIG. 3 illustrates an example estimation of lighting. Using equation (1), we may estimate the approximate lighting in the scene. For example, to those in the field, it may be seen from FIG. 3 that the lighting direction as seen on the captured image I 310 agrees with the lighting direction as shown on the polar plot 320. FIG. 4 illustrates an example estimation of shading. As shown in FIG. 4, the shading 410 may defined as f (N, L) 420. Shading may be defined as the intermediate quantity that resembles the variation of color when light is reflected off a surface in the direction of the camera capturing the image, which is the output of f (N, L) 420.

In particular embodiments, the electronic device 100 may determine the first, second, or third correction algorithm based on prior illumination information. The prior illumination information may be extracted per image from a plurality of images with each image depicting at least a face of a person. In particular embodiments, the prior illumination information may be computed using classical computer vision and computer graphics techniques. In another embodiment, a neural network may be used to learn the prior illumination information. The prior illumination information may be computed for each image (not derived from any dataset, etc.). Computing the prior illumination information may be a preprocessing step that takes place in training as well as testing time or during deployment. In particular embodiments, determining the prior illumination information may comprise the following steps. For each of the plurality of training images, the electronic device 100 may extract one or more facial landmarks for the face, estimate an amount of light reflected by the face, create a surface mesh from the one or more facial landmarks, estimate a respective surface normal for each point in the surface mesh, compute a lighting for the image based on one or more of the amount of light reflected by the face or the respective surface normal for each point in the surface mesh, and determine a shading for the image based on one or more of the lighting or the respective surface normal for each point in the surface mesh. More specifically, lighting may be calculated by using albedo (light reflected by the face in diffused illumination), surface normals, and original image. Given these quantities, the lighting may be obtained by solving equation (1). The electronic device 100 may then determine the prior illumination information, such as shading, based on the lighting associated with each of the plurality of training images. It should be noted that although the above describes computing prior illumination information for training images while training the correction algorithms, computing prior illumination information may be performed for each image at testing time or during deployment.

Figure 5:
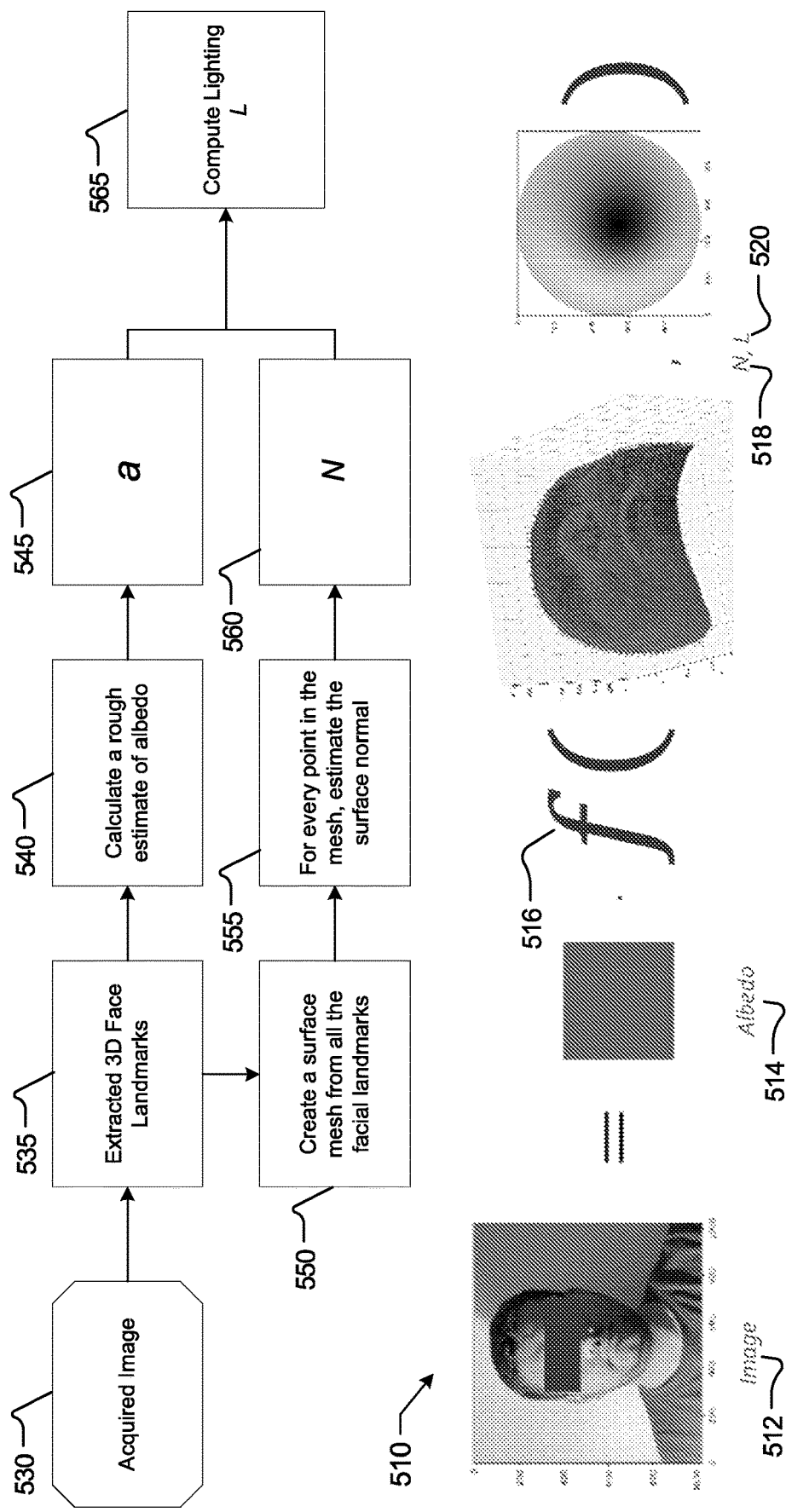
FIG. 5 illustrates an example diagram flow for computing lighting.

FIG. 5 illustrates an example diagram flow for computing lighting. The diagram flow may be based on the equation (1) 510 as visualized in FIG. 5. The image 512 may be based on estimated albedo 514 multiplying the shading function 516. The shading function 516 may be based off of Lambertian reflectance assumption, or similar, and may operate on the surface normal 518 and the lighting vector 520. According to equation (1) 510, at step 530, we may access the acquired image. At step 535, we may get the extracted 3D face landmarks. At step 540, we may calculate a rough estimate of albedo. At step 545, albedo a may be determined. After step 535, we may also create a surface mesh from all the facial landmarks at step 550. At step 555, for every point in the mesh, we may estimate the surface normal. At step 560, surface normal N may be determined. At step 565, we may compute lighting L by solving the linear system as shown in equation (1).

Figure 6:
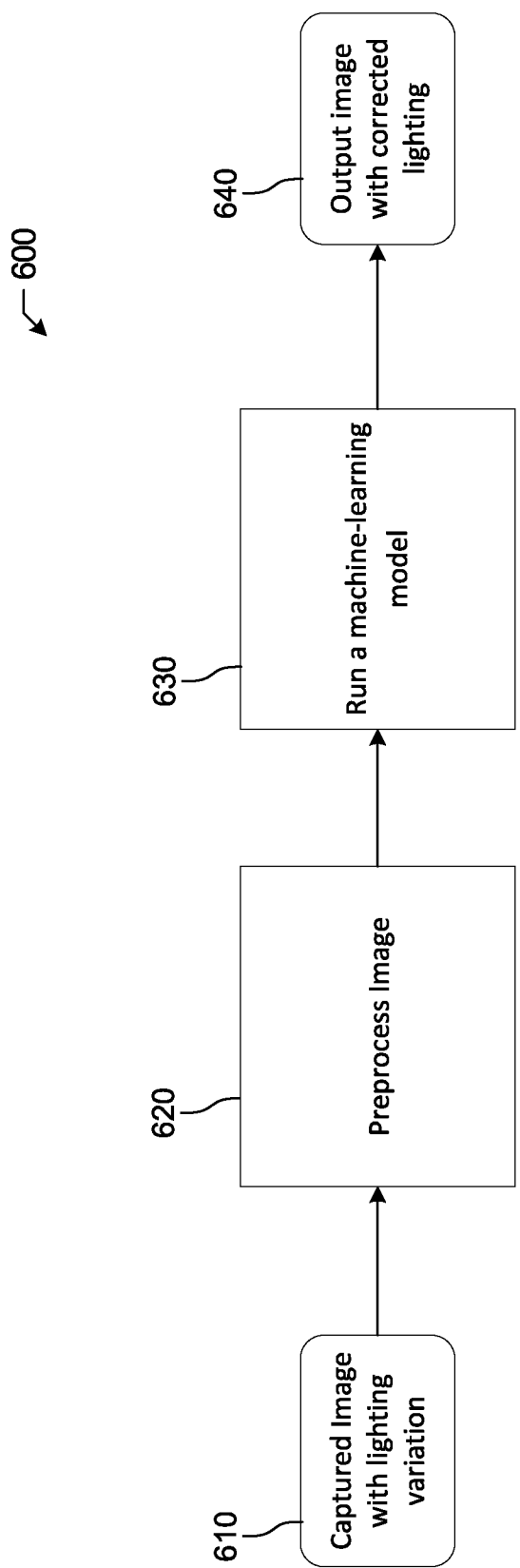
FIG. 6 illustrates an example flow diagram for correcting illumination.

In particular embodiments, the electronic device 100 may use a machine-learning model that can leverage all such intermediate representations such as the shading image, surface normal and meshes, lighting, etc. of an image to generalize across different illumination variations for portrait photographs. FIG. 6 illustrates an example flow diagram 600 for correcting illumination. At step 610, the electronic device 100 may access a captured image with lighting variation. At step 620, the electronic device 100 may preprocess the image. The preprocessing may comprise one or more of detecting a face and then computing facial landmarks, estimating intermediate quantities, or generating relevant priors. At step 630, the electronic device 100 may run a machine-learning model. As an example and not by way of limitation, the machine-learning model may be based on a neural network. At step 640, the electronic device 100 may output the image with corrected lighting.

In particular embodiments, a plurality of training and test images collected by an efficient data capturing and processing system may be required for training the machine-learning model. In particular embodiments, for modelling illumination and relighting portrait images, one may need a good in-the-wild dataset. We may define relighting (but not limited to) as fixing the overall lighting of a poorly lit portrait photo (that may have directional lighting, shadows, etc.) into a photo that looks as if it is captured in ambient lighting, or apply a new lighting/illumination effect to a photo that is already captured in an ambient setting for it to look more artistic or cinematic. In this context, "in-the-wild" means that the images are collected in the real world, outside of a lab or photography studio where conditions can be carefully controlled. In contrast to controlled datasets which may not faithfully represent the kind of photos that a typical user would capture, or datasets where the lighting may be staged, etc., and the images may have been post-processed, the images from the in-the-wild dataset are captured straight from the smartphone camera or any other camera-based devices, not limited to just a selfie camera without any post-processing (beside what is automatically applied during the capturing stage) or professional lighting setup. Current methodology for obtaining in-the-wild datasets may be as follows. One approach may be generating the dataset using simulation tools, rendering using graphics software/game engines, and using neural networks such as GANs. However, such data may not clearly represent all real-life scenarios since synthetic data may fail to reproduce the level of detail that a camera could capture in the real world. Additionally, the images may contain artifacts or be overly smooth and may not convey the necessary facial features such as wrinkles, etc. that are crucial for learning the correct operations. Another approach may include light stages or illumination variation capturing systems which may be based on extremely hardware intensive and expensive setups that require lot of space, cameras/sensors, complex data processing systems, and technical expertise. Due to the limitations of current datasets or data-generating methodology that yields non-realistic data, or extremely cumbersome to use, it may be crucial to develop a data capturing and processing system that can be implemented for any scenario pertaining to illumination modeling, capture great level of detail making it extremely realistic and accurate, be portable, and does not require expertise.

The embodiments disclosed herein may use an efficient capturing and processing pipeline for obtaining in-the-wild images. Although the pipeline is demonstrated for portrait images, it may be further extended to more general scenes as well. One may use a simple camera setup to capture the images that model high resolution detail, a broad distribution of illumination variations across portraits, and do not require cumbersome and extensive infrastructure.

Figure 7:
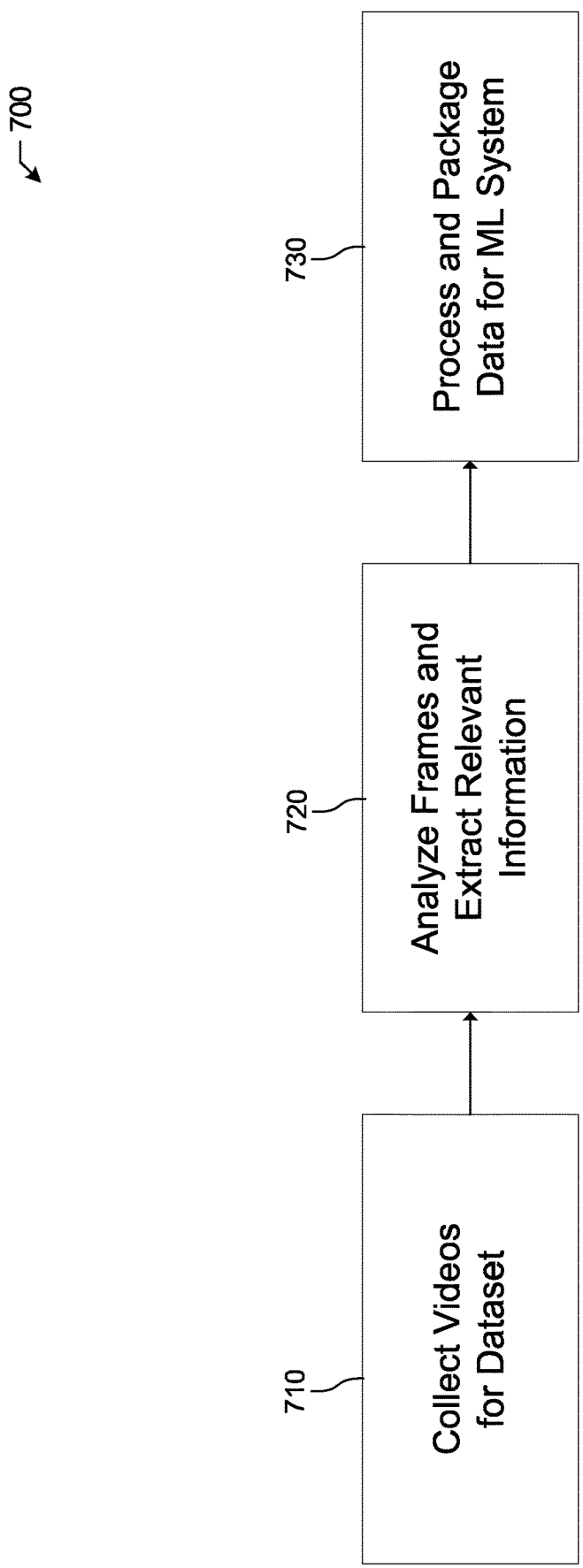
FIG. 7 illustrates an example pipeline for generating the in-the-wild dataset.

FIG. 7 illustrates an example pipeline 700 for generating the in-the-wild dataset. At step 710, we may collect videos for the dataset. For supervised machine learning, there may be the input data and the paired ground-truth data. To generate the in-the-wild dataset, for every person we may collect a ground-truth (GT) video and one or more videos that contain poor illumination, shadows or other environmental conditions such as indoor and outdoor illumination variations and foreign shadows. The videos with poor illumination may be collected simply by using the smartphone camera or any other camera and recording a video of oneself performing various activities. As an example and not by way of limitation, these activities may include, but not limited to, walking or moving through different lighting conditions, capturing videos through illumination variations at one's home, or similar environments where specialized technology is not required. The more varied the lighting is, the better the dataset may be. We may then process these videos to generate individual samples. The ground-truth may be captured with a simple setup using natural light or with some key and fill lights to get the studio quality lighting. The ground-truth may also be captured with the same smartphone camera or any camera-based device as used for the videos with poor illumination. At step 720, we may analyze frames and extract relevant information. Once the videos are collected for the dataset, the paired input/ground-truth videos may be processed and the relevant information (e.g. facial landmarks, lighting, shading, etc.) for the machine-learning model may be extracted. At step 730, we may process and package the data for the machine-learning model. The data may be packaged in necessary format such as a binary file.

Figure 8:
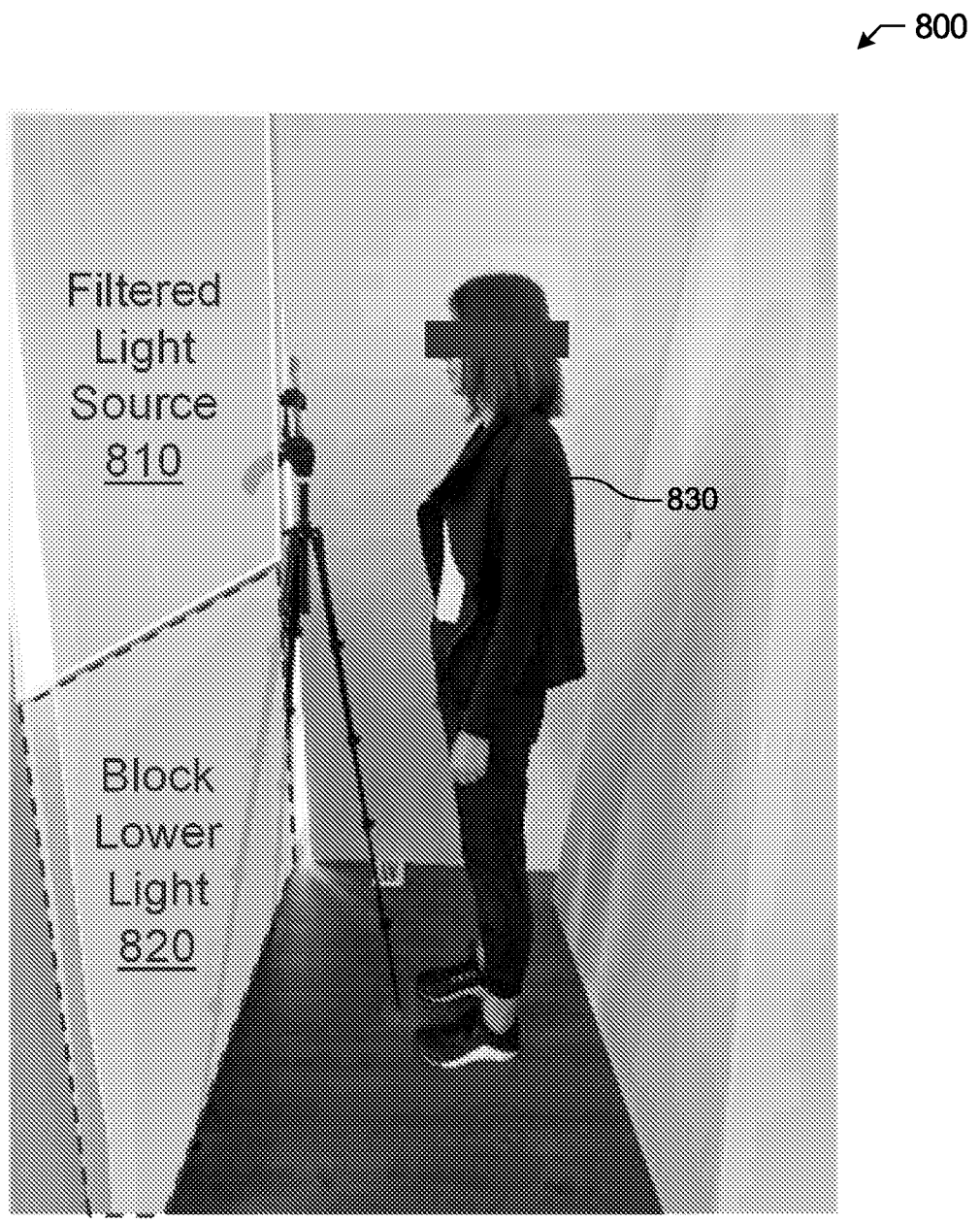
FIG. 8 illustrates an example setup for capturing the ground-truth images.

FIG. 8 illustrates an example setup for capturing the ground-truth images. Although FIG. 8 illustrates a particular setup, this disclosure contemplates any suitable setup based on other lighting conditions or methods for gathering the ground-truth images. The filtered light source 810 indicates that the light maybe filtered from a single source (e.g., sun/exterior). The filtered light source 810 may be the indirect light from the sun that is filtered and softened through the window shade. The blocked lower light indicates that the light from the other directions (e.g., forward lower, sides, behind) may be blocked. The light from other directions may be blocked by adding barriers around the person, turning off all other light sources, and/or going to a room with a single small/medium window. The video may be recorded by holding the camera in the hand or by placing it in a tripod. In the recording, the person 830 may move the head side to side, up and down and around in order to capture all possible poses of the face. This may be necessary to find the closest matching pose between the input image and the ground-truth image.

Figure 9:
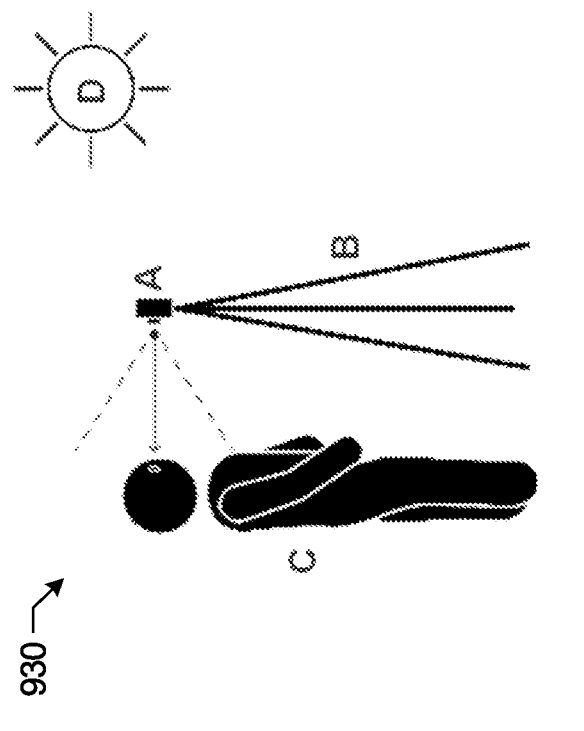
FIG. 9 illustrates an example checklist for recording videos.
Figure 9:
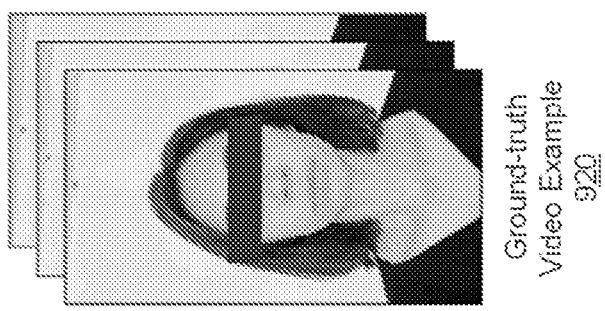
Figure 9:

FIG. 9 illustrates an example checklist for recording videos. FIG. 9 shows a varied-illumination video example 910, a ground-truth video example 920, and a corresponding setup 930 reflecting the checklist. For all videos recorded:
  A. The smartphone or camera-based device should be placed at or around eye level
  B. The device may be on a tripod, help by the hand of the person, or in some physical setup that guides the camera to move in a preset path to capture varied poses of the face.
  C. The person may be standing, seated, on a stage or spinning chair that can rotate manually or automatically, etc.
  D. The lighting can be generated using natural light, studio lighting, or artificial light or any combination. It may include one or more light sources.

Figure 10:
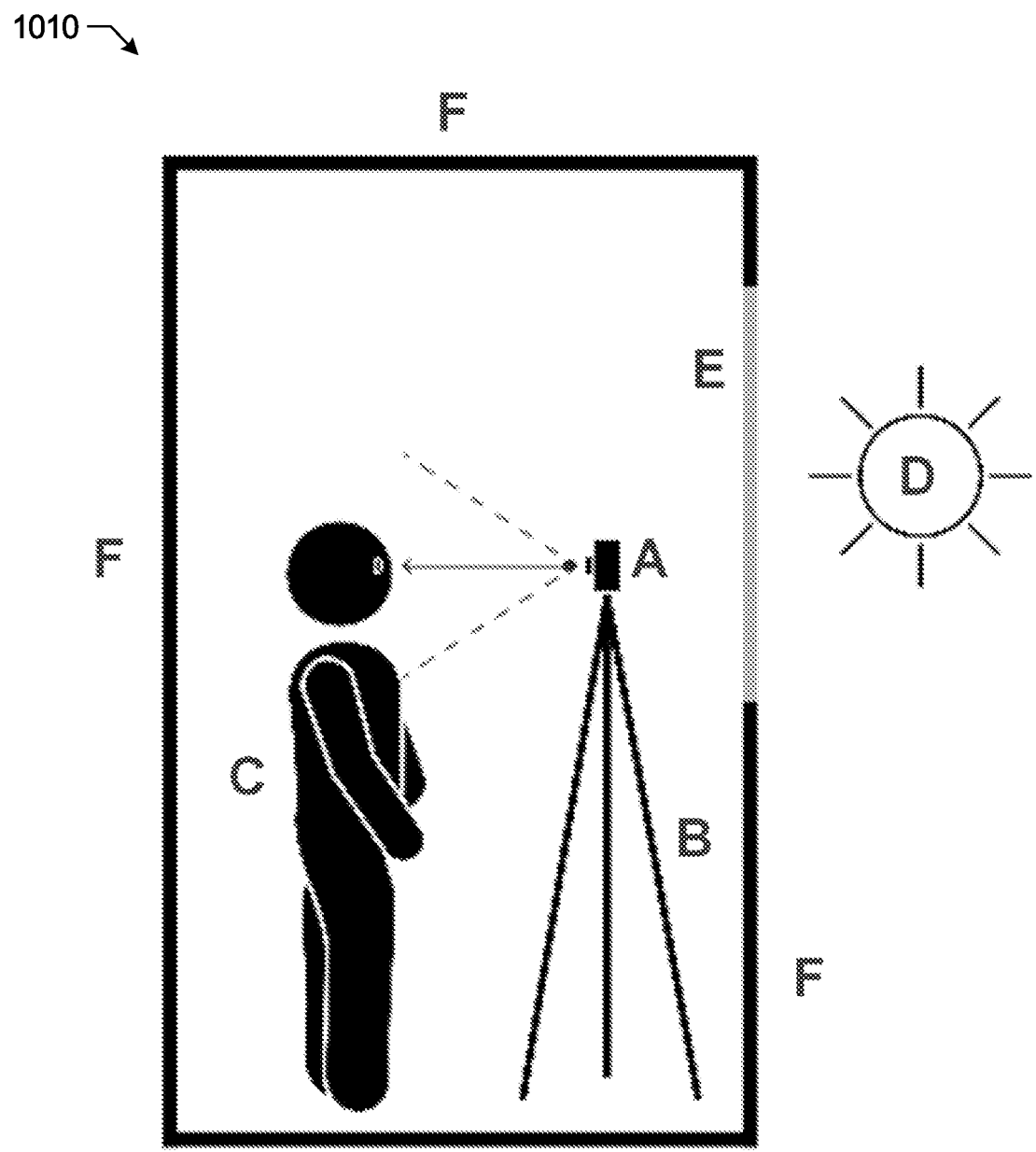
FIG. 10 illustrates another example checklist for recording videos.

FIG. 10 illustrates another example checklist for recording videos. FIG. 10 shows a setup 1010 reflecting the checklist. For videos with controlled lighting especially the ground-truth videos:
  A. The smartphone or camera-based device should be placed at or around eye level.
  B. The device may be on a tripod, held by the hand of the person, or in some physical setup that guides the camera to move in a preset path to capture varied poses of the face.
  C. The person may be standing, seated, on a stage, or spinning chair that can rotate manually or automatically, etc.
  D. The lighting may be generated using natural light, studio lighting, or artificial light, or any combination. The lighting may include one or more light sources.
  E. The light may be filtered or diffused using a shade, curtains, film, or any other method. Alternatively, the video may also be recorded during a cloudy day or using a north facing window.
  F. To control the lighting direction, other lights in the space may be turned off. Additionally, other forms of illumination (e.g. reflected light) may also be blocked using physical barriers, opaque screens, walls, etc. These may be used to block light from all other directions besides a small to medium opening for the light source.

Next, we may process the videos in order to produce the final dataset. For every person in the dataset, we may take the ground-truth video, compute landmarks, and crop faces for every frame. We may store the landmarks in a matrix. For every $n^{th}$ frame of every video (Note: we may not need to process every single frame since lighting changes are generally smooth), we may perform the following steps. Firstly, we may compute landmarks, center and crop the face in the RGB image, and rescale the landmarks to match. During this step, we may calculate the face mask using the landmarks and convert the face-cropped RGB image to luminance and/or chrominance (e.g., YCbCr, CIE-Lab, etc.). Secondly, we may get the closest ground-truth (GT) image, which may comprise calculating the closest match using a distance metric (e.g., L1 or L2 norm) between the landmarks or by looking for the closest pose. Thirdly, we may extract the normal, which may comprise estimating lighting using semi-definite programming, QR decomposition, etc. Fourthly, we may calculate shading. Lastly, we may save the data comprising input triangle mesh mask, shading estimate, ground-truth triangle mesh mask, and input and ground-truth image based on all required formats. In particular embodiments, the triangle mesh mask may be generated as follows. For each triangle face in the mesh, there may a mask for those pixels that fall within the triangle. These may each be stored as its own full resolution mask, but this may be not efficient. For improved space efficiency, each triangle's mask may store the position (e.g., x/y coordinates or unrolled index) of each pixel included in the triangle.

Figure 11:
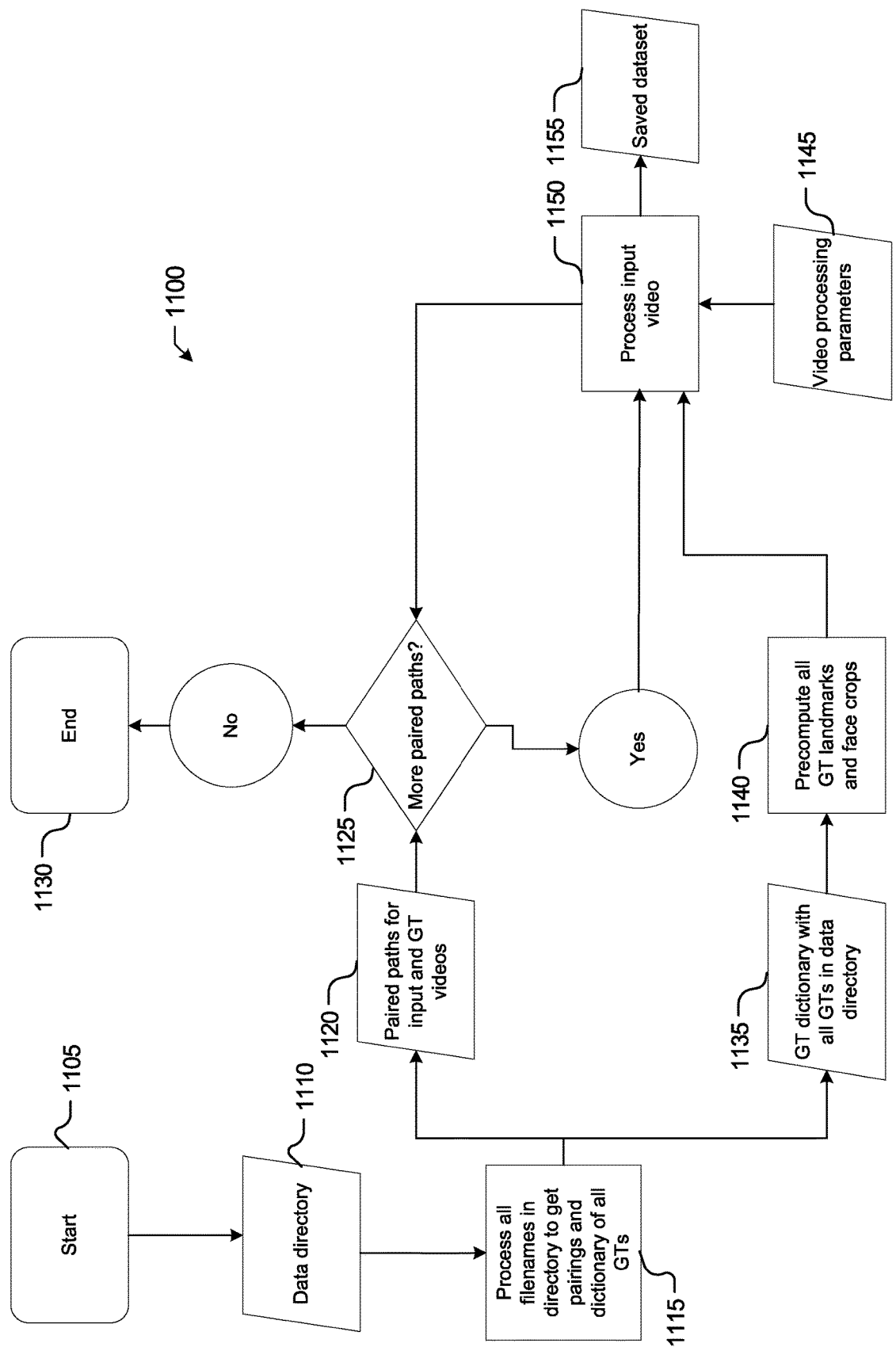
FIG. 11 illustrates an example data processing pipeline for generating the final dataset.

FIG. 11 illustrates an example data processing pipeline 1100 for generating the final dataset. At a high-level, the data processing pipeline 1100 may take a data directory as input, find pairing between ground-truth (GT) and input, and generate the entire dataset with parameters. The data processing may start at step 1105. At step 1110, the data directory may be accessed. At step 1115, the data processing pipeline 1100 may process all filenames in the directory to get pairings and the dictionary of all ground-truths (GTs). At step 1120, the data processing pipeline 1100 may get paired paths for input and ground-truth (GT) videos. At step 1125, the data processing pipeline 1100 may determine whether there are more paired paths. If there are no more paired paths, the data processing pipeline may end at step 1130. If there are more paired paths, the data processing pipeline 1100 may proceed to step 1145. Parallel to step 1120, the data processing pipeline 1100 may get ground-truth dictionary with all ground-truths in the data directory at step 1135. At step 1140, the data processing pipeline 1100 may precompute all ground-truth (GT) landmarks and face crops. The details of step 1140 are described as follows in FIG. 12.

Figure 12:
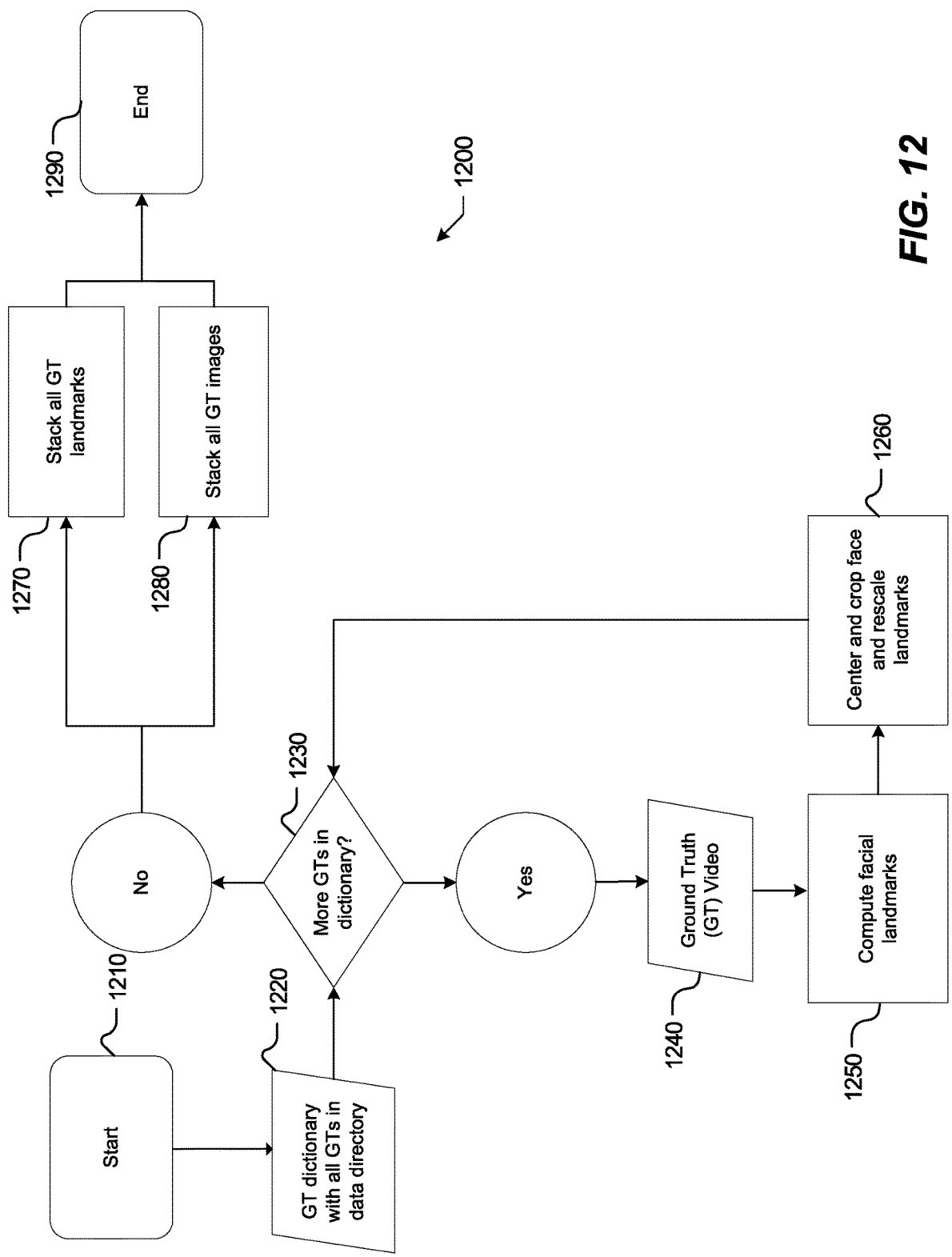
FIG. 12 illustrates an example diagram flow for precomputing all ground-truth landmarks and face crops.

FIG. 12 illustrates an example diagram flow 1200 for precomputing all ground-truth landmarks and face crops. The diagram flow 1200 shows the preprocessing of the ground-truth dictionary. Computing landmarks may be computationally expensive, so it may be more efficient to precompute and store in a dictionary for later use. The diagram flow 1200 may start at step 1210. At step 1220, the diagram flow 1200 may retrieve the ground-truth (GT) dictionary with all ground-truths (GTs) in the data directory. At step 1230, the diagram flow 1200 may determine if there are more ground-truths (GTs) in the dictionary. If there are more ground-truths in the dictionary, the diagram flow 1200 may proceed to step 1240 to identify the ground-truth (GT) video. At step 1250, the diagram flow 1200 may compute the facial landmarks for one or more frames from the GT video. At step 1260, the diagram flow 1200 may center and crop the face and rescale the landmarks for one or more frames from the GT video. Then the diagram flow 1200 may return to step 1230. If there are no more ground-truths in the dictionary, the diagram flow 1200 may proceed to step 1270 and step 1280 in parallel. At step 1270, the diagram flow 1200 may stack all ground-truth (GT) landmarks. At step 1280, the diagram flow 1200 may stack all ground-truth (GT) images. The diagram flow 1200 may end at step 1290.

Referring back to FIG. 11, at step 1145, the data processing pipeline 1100 may access video processing parameters. These parameters may be either default stored parameters and/or parameters the engineers performing data processing would specify. At step 1150, the data processing pipeline 1100 may process the input video. The details of step 1150 are described as follows in FIG. 13.

Figure 13:
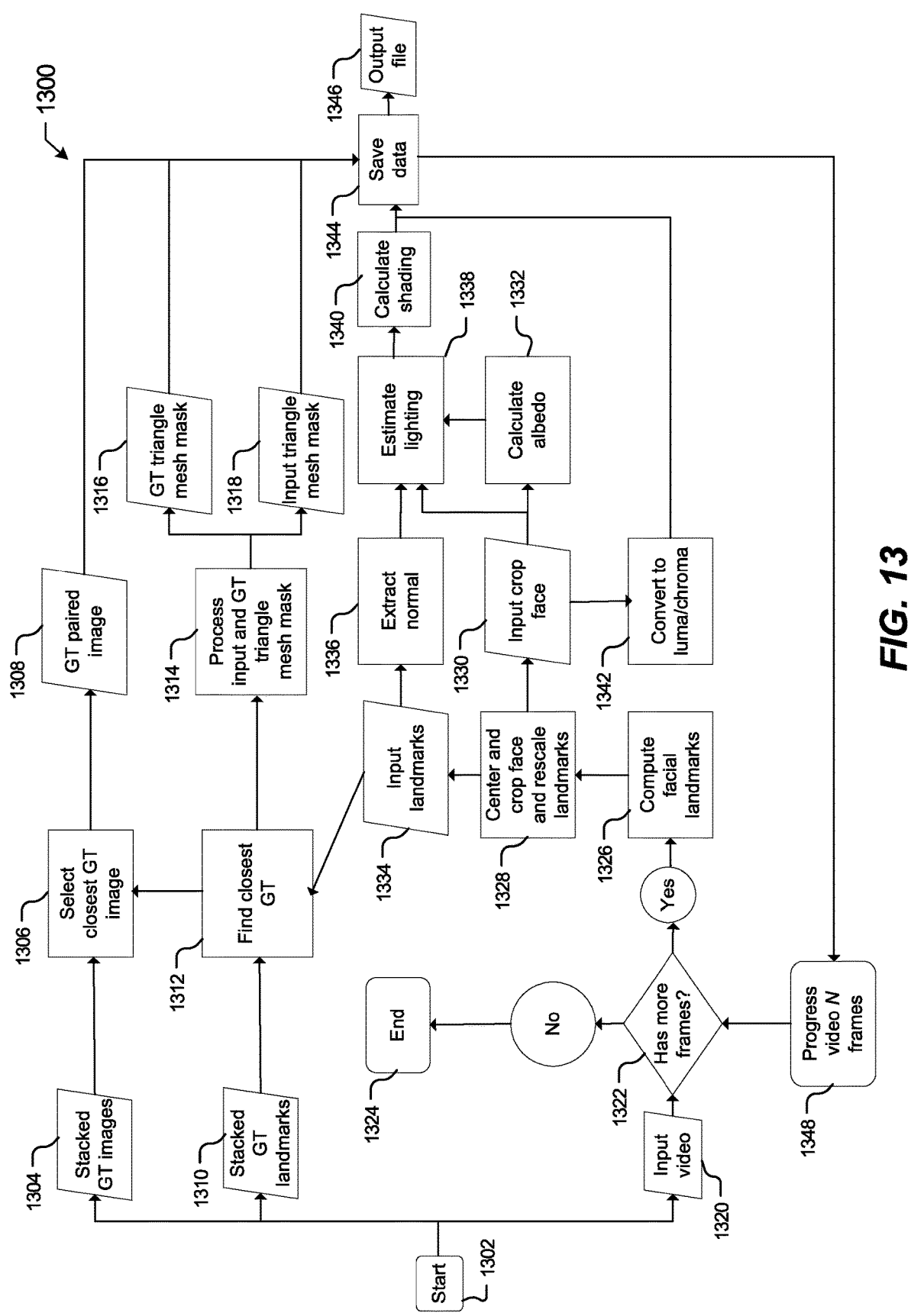
FIG. 13 illustrates an example diagram flow for processing input videos.

FIG. 13 illustrates an example diagram flow 1300 for processing input videos. The diagram flow 1300 shows the entire process for extracting the required data from the input video and ground-truth data. The diagram flow 1300 may start at step 1302. After step 1302, the diagram flow 1300 may proceed with three sub-flows. For the first sub-flow, the diagram flow 1300 may access the stacked ground-truth (GT) images at step 1304. At step 1306, the diagram flow 1300 may select the closest ground-truth (GT) image by using selection from step 1312. At step 1308, the diagram flow 1300 may generate the ground-truth paired image. For the second sub-flow, the diagram flow 1300 may access the stacked ground-truth (GT) landmarks at step 1310. At step 1312, the diagram flow 1300 may find the closest ground-truth (GT) pairing using some metric, e.g., the distance between the input landmarks retrieved from step 1334 and ground-truth landmarks. At step 1314, the diagram flow 1300 may process the input and ground-truth (GT) triangle mesh mask. At step 1316, the diagram flow 1300 may generate ground-truth (GT) triangle mesh mask. Parallel to step 1316 at step 1318, the diagram flow 1300 may generate the input triangle mesh mask. For the third sub-flow, the diagram flow 1300 may access the input video at step 1320. At step 1322, the diagram flow 1300 may determine whether it has more frames. If it does not have more frames, the sub-flow may end at step 1324. If it has more frames, the diagram flow 1300 may proceed to step 1326 to compute the facial landmarks from the current frame. At step 1328, using the landmarks from step 1326 the diagram flow 1300 may center and crop the face to produce 1330 and rescale the landmarks to produce 1334. At step 1332, the diagram flow 1300 may use the cropped face 1330 to calculate an albedo estimate. After step 1334, the diagram flow 1300 may additionally proceed to step 1336 to use the scaled facial landmarks 1334 to compute surface normals from the landmarks. At step 1338, the diagram flow 1300 may estimate lighting based on the input crop face from step 1330, surface normals from step 1336, and calculated albedo from step 1332. At step 1340, the diagram flow 1300 may calculate shading. At step 1342, the diagram flow 1300 may convert the cropped face from the input image to luma and chroma. At step 1344, the diagram flow 1300 may save data including but not limited to the calculated shading, luma/chroma of the cropped input image and cropped GT image, and triangle mesh masks for both the input and GT images. At step 1346, the diagram flow 1300 may output the file of the data generated in step 1344. After step 1344, the diagram flow 1300 may otherwise proceed to step 1340 to progress the video N frames. For example, N frames may be skipped because many nearby frames may be redundant. After step 1348, the diagram flow 1300 may return to step 1322 to determine whether the video has more frames.

Referring back to FIG. 11 again, after step 1150, the data processing pipeline 1100 may generate the saved dataset at step 1155. Developing a formulation, capture and processing pipeline for in-the-wild data for relighting that is simple and easy to use and generates similar but un-aligned pairs of input and ground truth data may be an effective solution for addressing the technical challenge of current methods reliance on pixel-wise aligned datasets and a lack of simple and efficient data capture and processing systems.

For a machine-learning model to be efficient in terms of performance, runtime, etc. while providing a quality output, the embodiments disclosed herein create a neural network architecture that learns the illumination correction to be made to an image and not create/generate/hallucinate the corrected image itself. As a result, the embodiments disclosed herein may provide the following technical advantages. One technical advantage may include that the neural network size may decrease for learning the correction compared to learning to create/hallucinate/generate the actual image. Another technical advantage may include that learning the correction may be done on a lower resolution image, followed by applying the learned correction to the high-resolution image, which may make it less complex of a machine-learning model. Another technical advantage may include that the corrected image and input image may have the identical spatial and structural fidelity unlike the machine-learning approaches that create/hallucinate/generate the corrected image since the correction is applied on the high-resolution image.

Figure 14:
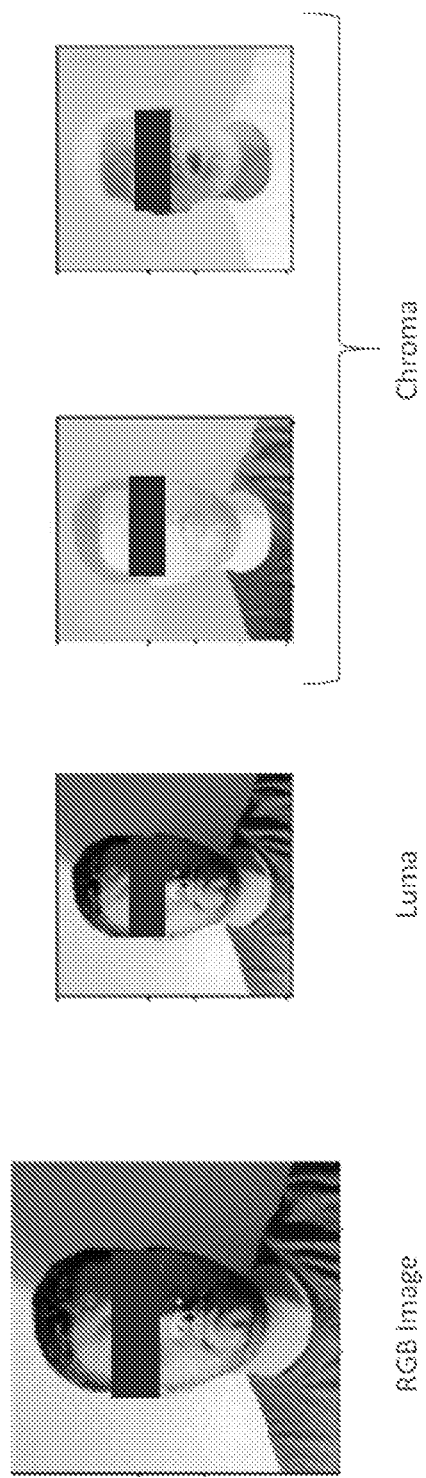
FIG. 14 illustrates example luminance and chrominance channels of a given RGB image.

The embodiments disclosed herein may also incorporate priors from the prior illumination information captured using methods described previously in this disclosure, and such priors may include but are not limited to, shading and lighting. FIG. 14 illustrates example luminance and chrominance channels of a given RGB image. As may be seen from the images in FIG. 14, luma may be high-fidelity and chroma may be more compressible. The embodiments disclosed herein may leverage such priors in designing of the light-weight machine-learning model.

Figure 15:
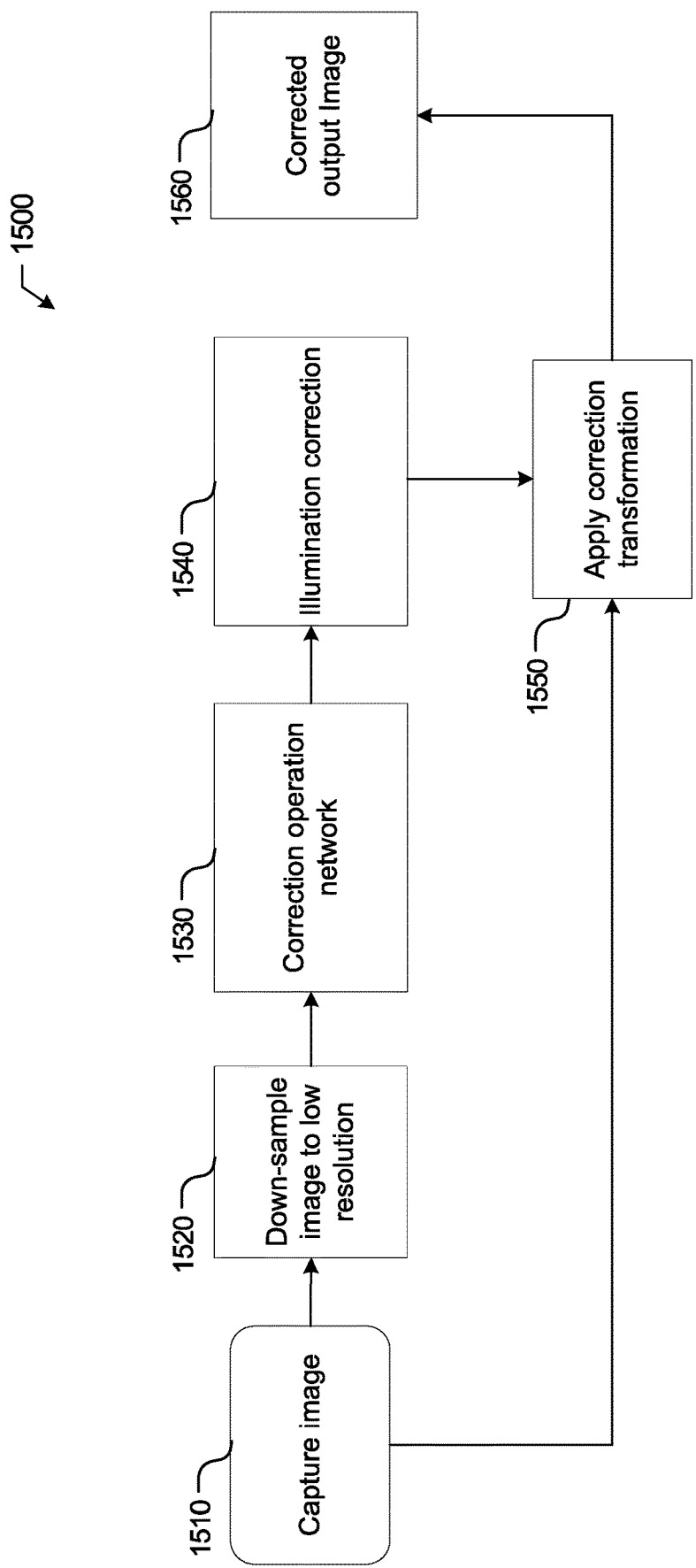
FIG. 15 illustrates an example high-level flow of using the machine-learning model for illumination correction.

FIG. 15 illustrates an example high-level flow 1500 of using the machine-learning model for illumination correction. At step 1510, the electronic device 100 may capture an input image. The input image may be at a first resolution. At step 1520, the electronic device 100 may down-sample the input image from the first resolution to a second resolution. The second resolution may be lower than the first resolution. At step 1530, the electronic device 100 may process the down-sampled image with a correction operation network. At step 1540, the correction network may determine the illumination correction. At step 1550, the electronic device 100 may apply the correction transformation to the captured image. At step 1560, the electronic device 100 may generate the corrected output image.

In particular embodiments, for a captured image I, we may write the corrected image as:

$$\hat{I}=A\cdot I+b \qquad (2)$$

Where $\hat{I}$ indicates the corrected output image and A, b model the illumination correction that is applied to the image at full resolution. More specifically, we may assemble the output image by correcting luma and chroma information separately. The embodiments disclosed herein may use a convolutional (and dense) neural network.

Figure 16:
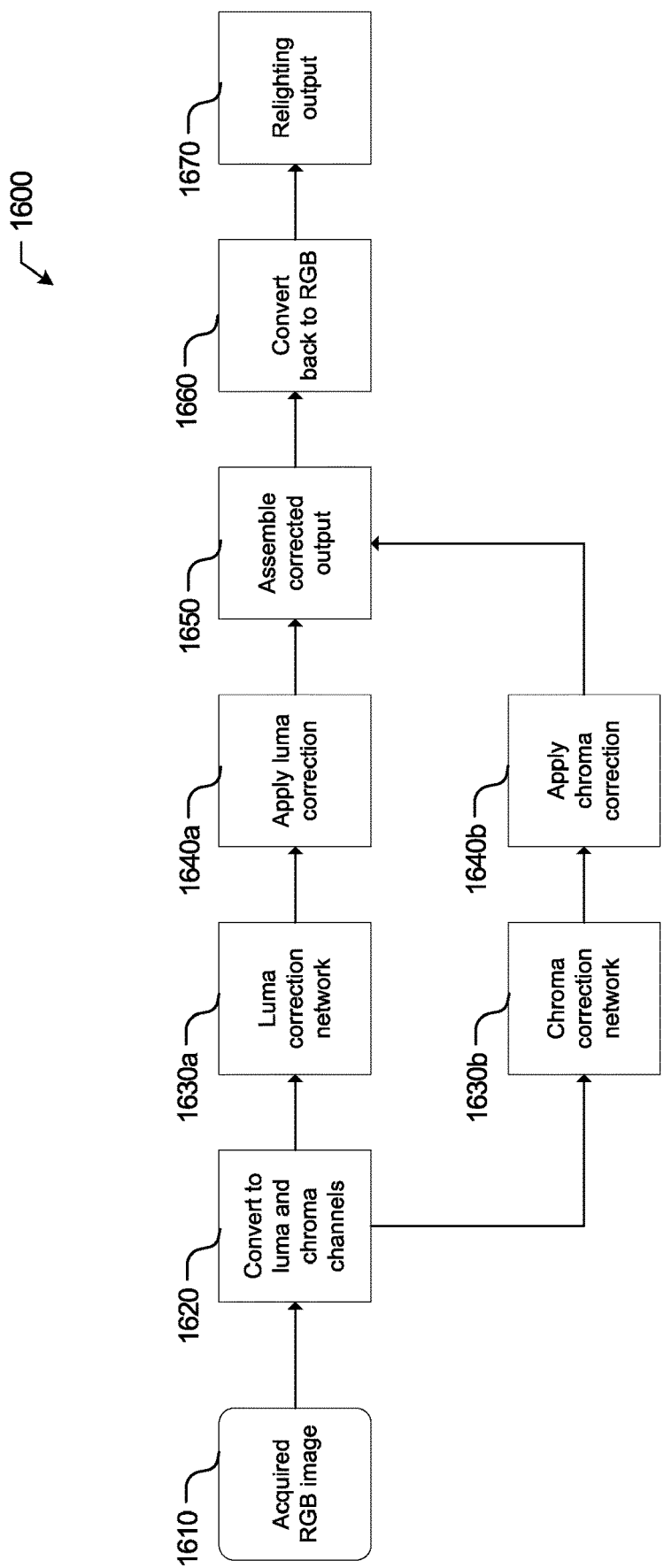
FIG. 16 illustrates an example diagram flow of illumination correction based on luma and chroma.

FIG. 16 illustrates an example diagram flow 1600 of illumination correction based on luma and chroma. In particular embodiments, the input image may comprise a first RGB image. At step 1610, the electronic device 100 may access the acquired RGB image. In particular embodiments, the first channel may be a luminance channel and the second and third channels may be chrominance channels. At step 1620, the electronic device may convert the RGB image into a set of luminance (luma) and chrominance (chroma) channels. As an example and not by way of limitation, the conversion may comprise one or more of YCbCr color transformation or CIE-Lab transformation. The goal of step 1620 is to decouple color and structure from the image in a fast way.

Figure 17:
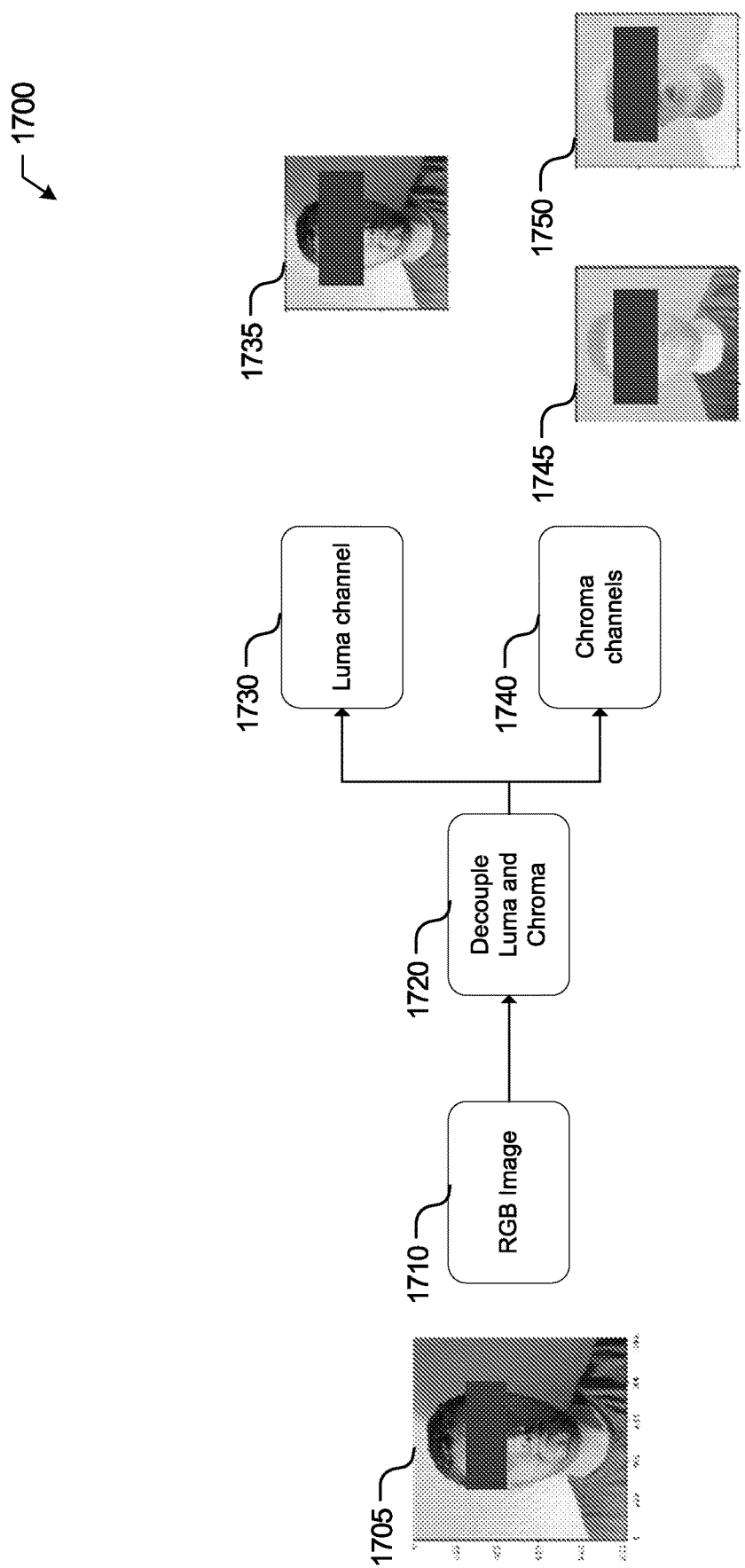
FIG. 17 illustrates an example conversion to luma and chroma channel.

FIG. 17 illustrates an example conversion to luma and chroma channels. At step 1710, the electronic device 100 may access the RGB image 1705. At step 1720, the electronic device may convert the RGB image to luma and chroma channels by converting the image color space to, for instance, YCbCr. At step 1730, the electronic device 100 may extract luma channel, e.g., a Y-channel image 1735. At step 1740, the electronic device 100 may extract chroma channels, e.g., a Cb-channel image 1745 and a Cr-channel image 1750.

Referring back to FIG. 16, after step 1620, the electronic device 100 may process the converted luma-channel image with a luma correction network at step 1630a. At step 1640a, the electronic device 100 may apply luma correction to the luma-channel image. Parallel to steps 1630a-1640a, at step 1630b, the electronic device 100 may process the converted chroma-channels image (e.g. Cb and Cr) with one or more chroma correction networks. At step 1640b, the electronic device 100 may apply chroma corrections to the chroma-channel images. In particular embodiments, generating the output corrected image corresponding to the input image based on the first, second, and third mono-channel corrected images may comprise generating an assembled image by assembling the first, second, and third mono-channel corrected images and converting the assembled image to a second RGB image. The output correct image may be the second RGB image. At step 1650, the electronic device 100 may assemble the corrected output based on the correction on luma channel and the correction on chroma channels. At step 1660, the electronic device 100 may convert the assembly back to RGB image. At step 1670, the electronic device 100 may generate the relighting output.

In particular embodiments, both luma correction network 1630a and chroma correction networks 1630b may be based on the same concept. Hence, their underlying mathematics may be the same, which may be explained as follows.

The goal of the lightweight machine-learning model may be to learn the correction operator but not generate the corrected output. Accordingly, we may have the following formulation.

$$\hat{L}=A_l \cdot L+b_l$$

$$\hat{I}=A \cdot I+b \rightarrow \widehat{Cb}=A_{cb} \cdot Cb+b_{cb} \quad (3)$$

$$\widehat{Cr}=A_{cr} \cdot Cr+b_{cr}$$

Equation (3) means that each pixel in the luma or chroma may be scaled and offset, where A is the per-pixel scaling and b is a per-pixel offset for the respective image/luma/chroma channels. As mentioned previously, we may learn the correction operation A, b based on a low-resolution input image and illumination priors.

Figure 18:
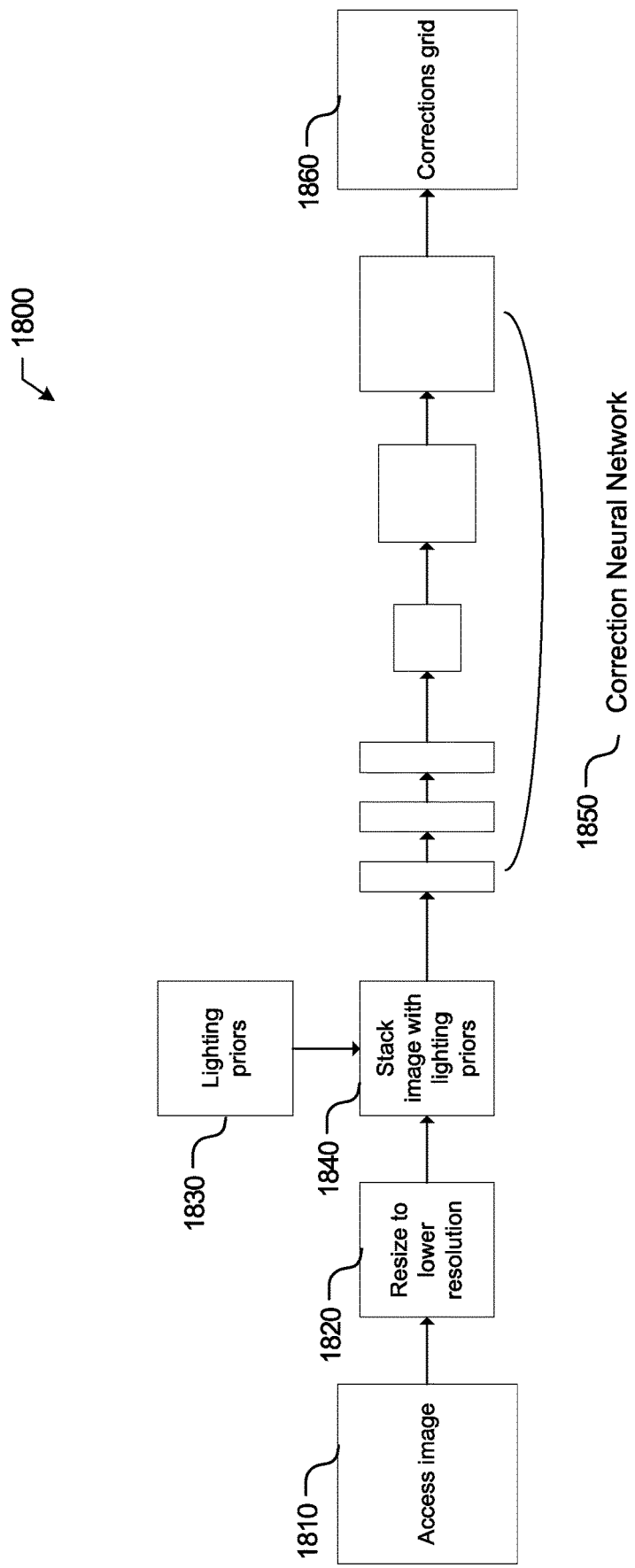
FIG. 18 illustrates an example flow diagram for learning the correction operation.

FIG. 18 illustrates an example flow diagram 1800 for learning the correction operation. In particular embodiments, we may learn A and b using the correction network 1630. At step 1810, the electronic device 100 may access an image. At step 1820, the electronic device 100 may resize the image to a lower resolution. At step 1830, the electronic device 100 may receive illumination/lighting priors. At step 1840, the electronic device 100 may stack the image with lighting priors. Accordingly, the input to the correction neural network may comprise a stacked input of the low-resolution image along with lighting priors. At step 1850, the electronic device 100 may input the stacked data into the correction neural network. At step 1860, the correction neural network may output a corrections grid. The shape/dimension of the grid may be represented as GD×GH×GW×GP, where GD indicates the grid depth, GH indicates the grid height, GW indicates the grid width, and GP indicates the number of per-pixel correction operations learned/needed. GH, GW may take values corresponding to the span of the spatial range of the image whereas GD may take values corresponding to the span of the illumination range for the image. As an example and not by way of limitation, GP may be 2 for scale and offset (A, b) when operating on a single-channel image. Once the corrections grid is computed, the electronic device 100 may interpolate the correction to the image conditioned on the input image. By applying the illumination correction conditioned on the input image, we may also infer the embodiments disclosed herein as means to compute a lookup-table that corrects the illumination for a given image.

Figure 19:
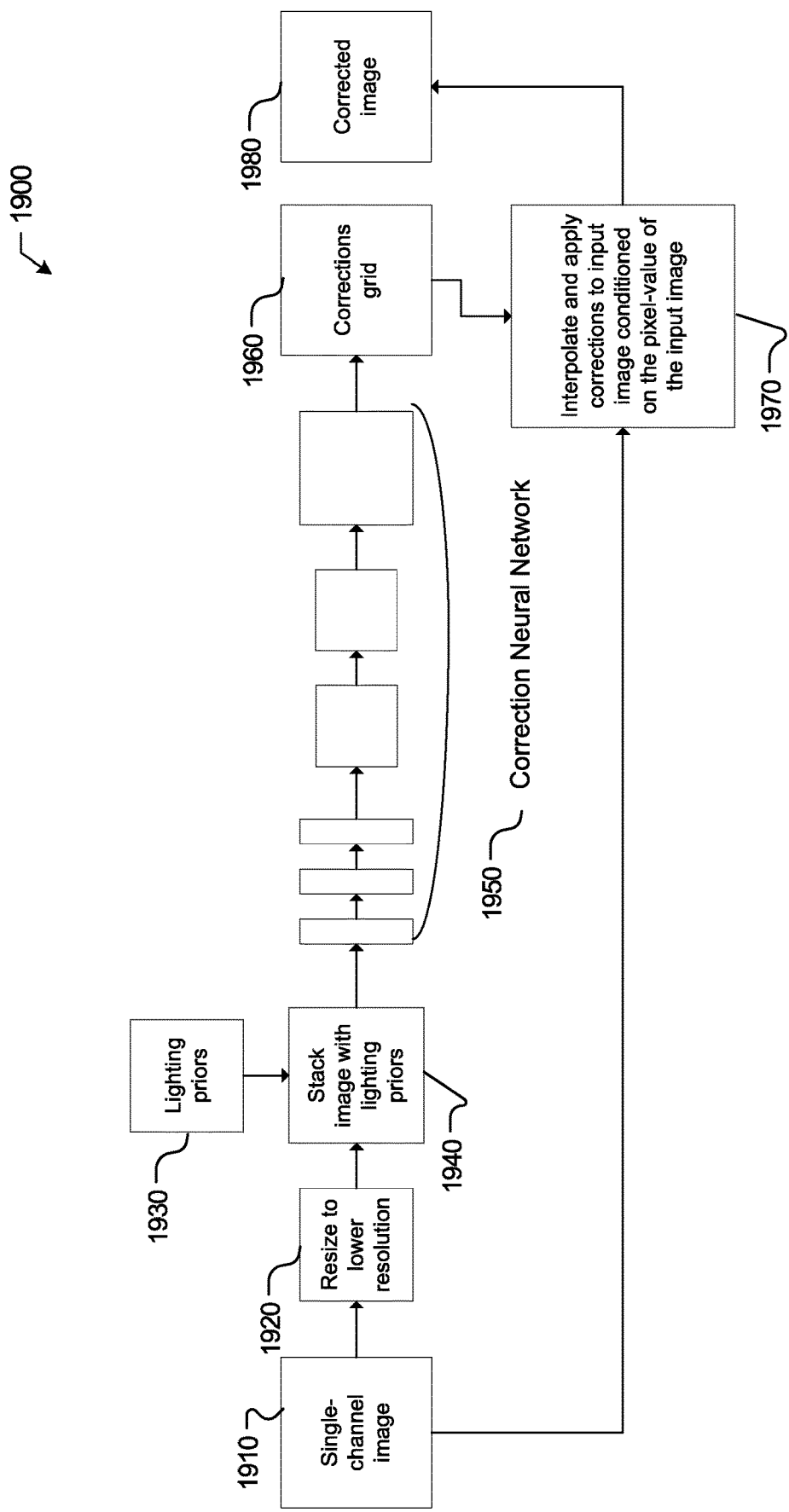
FIG. 19 illustrates an end-to-end architecture for correcting the lighting for a single-channel image.

FIG. 19 illustrates an end-to-end architecture 1900 for correcting the lighting for a single-channel image. At step 1910, the electronic device 100 may access a single-channel image. At step 1920, the electronic device 100 may resize the image to a lower resolution. At step 1930, the electronic device 100 may receive lighting priors such as shading. At step 1940, the electronic device 100 may stack the image with lighting priors. At step 1950, the electronic device 100 may input the stacked data of the low-resolution image along with lighting priors into the correction neural network comprising a collection of convolutional and dense layers. At step 1960, the correction neural network may output a corrections grid. The shape/dimension of the grid may be represented as GD×GH×GW×GP, where GD indicates the grid depth, GH indicates the grid height, GW indicates the grid width, and GP indicates the number of per-pixel correction operations learned/needed. At step 1970, the electronic device 100 may interpolate and apply corrections to input image conditioned on the pixel-value of the input image. At step 1980, the electronic device 100 may generate the corrected image. Although FIG. 19 illustrates an architecture for a single channel, the architecture may be extended to multiple channels as well.

Figure 20:
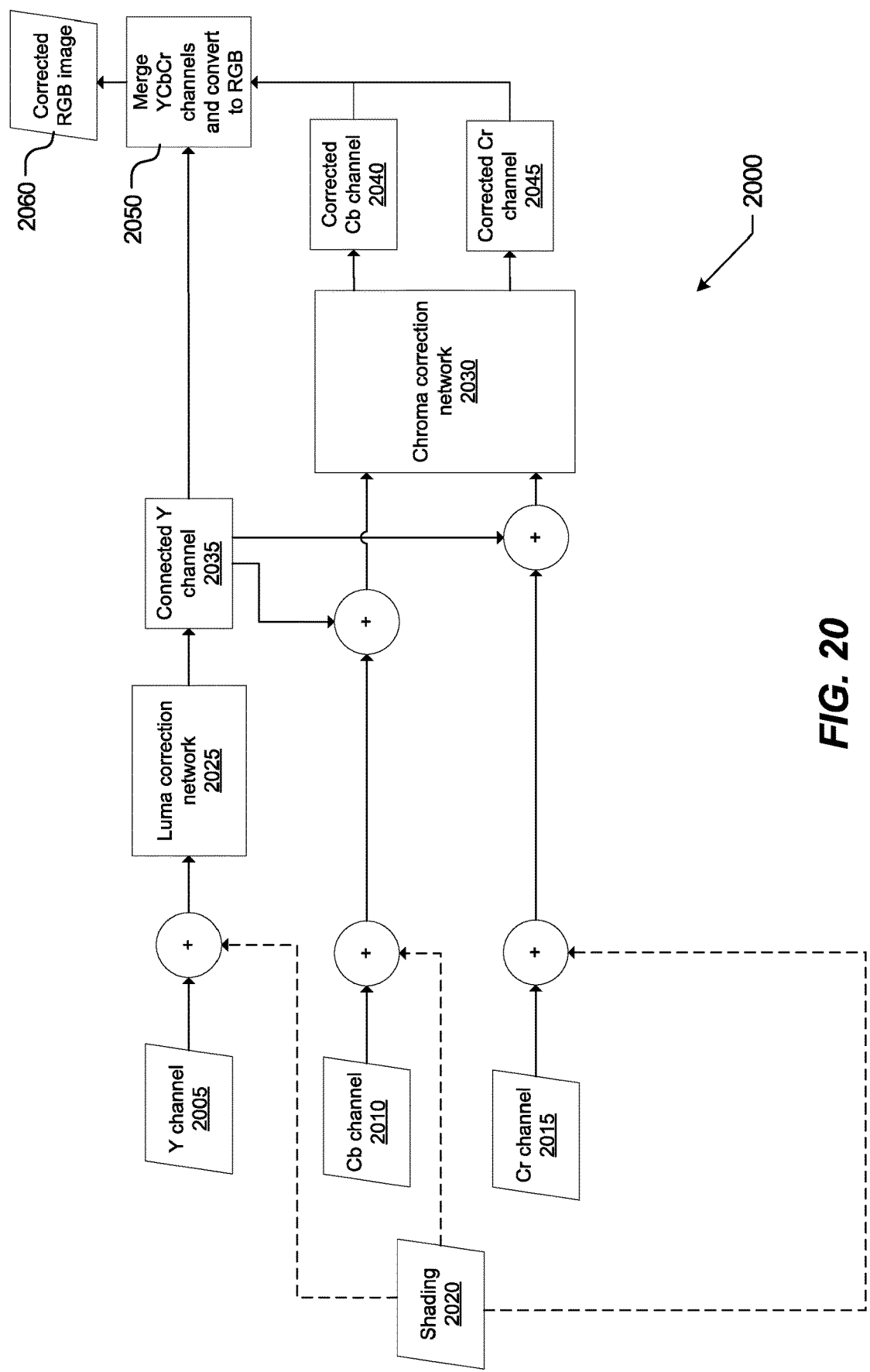
FIG. 20 illustrates an example architecture for determining image illumination correction for a full 3-channel image.

FIG. 20 illustrates an example architecture 2000 for determining image illumination correction for a full 3-channel image. The input luma channel may be Y channel 2005. The input chroma channels may include Cb channel 2010 and Cr channel 2015. Although YCbCr are used as the input luma and chroma channels as an example here, any luma and chroma formulation may be used. In particular embodiments, shading 2020 may be concatenated to each luma and chroma channel (i.e., Y channel 2005, Cb channel 2010, and Cr channel 2015) individually before they are sent to the luma correction network 2025 and chroma correction network(s) 2030, respectively. In alternative embodiments, shading 2020 may be not used and each luma and chroma channel may be sent to the correction networks alone. In both embodiments, after the corrected Y channel 2035 is output from the luma correction network 2025, the Y channel may or may not be concatenated onto the chroma channels (i.e., Cb channel 2010 and Cr channel 2015) before inputting into the chroma correction network 2030. In particular embodiments, the chroma correction network 2030 may be separate or joint for the corrected Cb channel 2040 and corrected Cr channel 2045. At step 2050, the electronic device 100 may merge YCbCr channels and convert them to an RGB image. At step 2060, the electronic device 100 may generate the corrected RGB image. Using color theory to leverage the compressibility of chroma while maintaining high-fidelity structural detail in the luma channel by using a smaller network size for chroma than luma may be an effective solution for addressing the technical challenge of training a neural network for correcting illumination that is lightweight enough to run on mobile devices.

Figure 21:
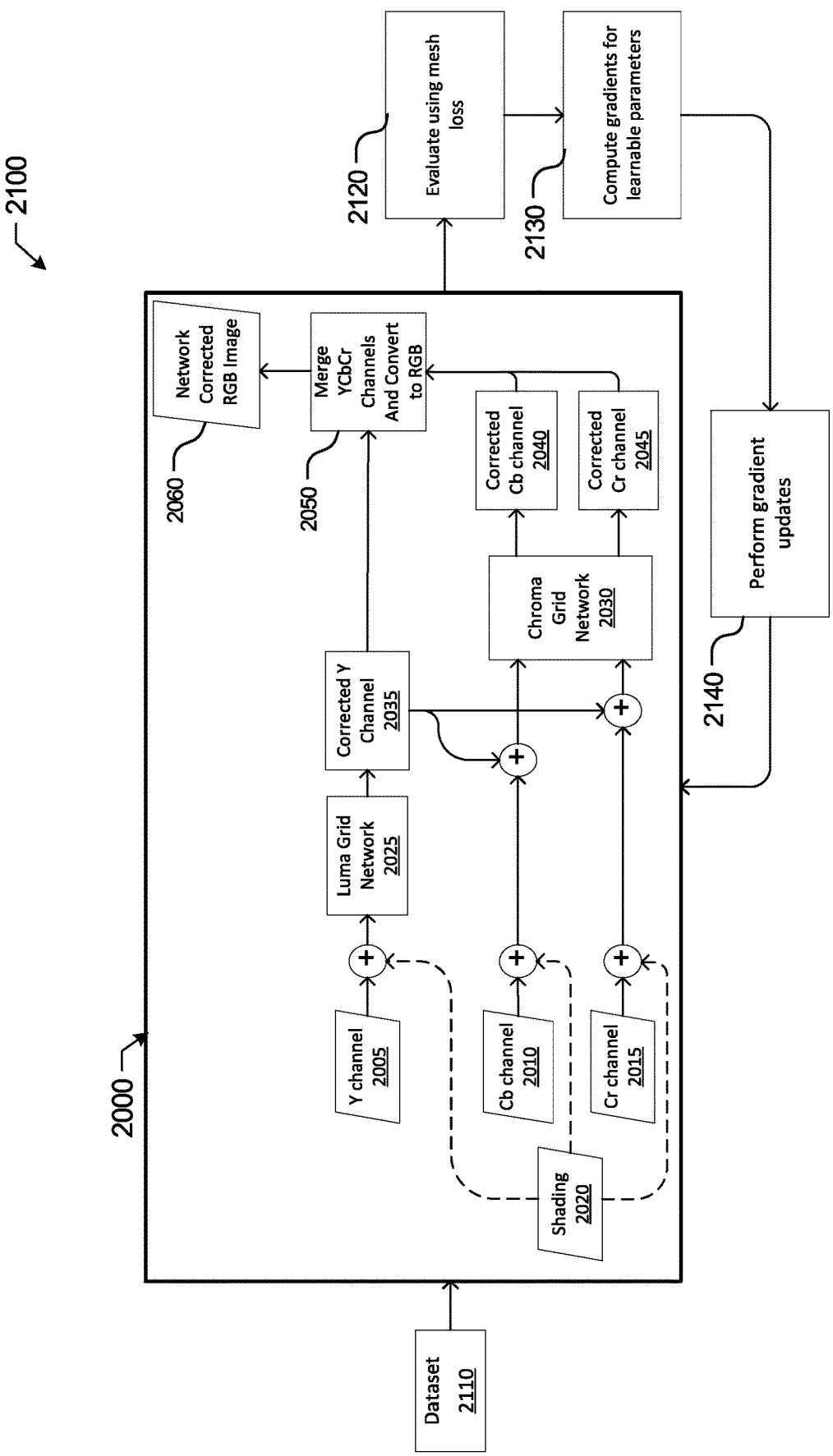
FIG. 21 illustrates an example architecture for training a lightweight machine-learning model leveraging chroma compressibility prior.

In particular embodiments, leveraging chroma compressibility prior may make the machine-learning model more lightweight. As mentioned before, luma channel may comprise high-fidelity structural detail and chroma channel may be more compressible. As a result, the chroma correction network may learn a correction grid that may be a lot smaller and compressible (in size) compared to the luma grid learned from the luma correction network. This may in turn reduce the number of parameters that the machine-learning model needs to learn as well as improve the runtime performance. FIG. 21 illustrates an example architecture 2100 for training a lightweight machine-learning model leveraging chroma compressibility prior. The in-the-wild dataset 2110 collected as described previously may be input to the machine-learning model based on the architecture 2000. The output of the machine-learning model may be evaluated using a mesh loss at step 2120. In particular embodiments, the mesh loss function may operate on two un-aligned training images by comparing a color distribution in one or more regions of the face depicted in each of the two images. At step 2130, the electronic device 100 may compute gradients for learnable parameters. In particular embodiments, the electronic device 100 may compute one or more gradients with respect to one or more parameters associated with the first, second, or third correction algorithm based on the mesh loss function. At step 2140, the electronic device 100 may perform gradient updates to the machine-learning model. In particular embodiments, the electronic device may update the first, second, or third correction algorithm based on the one or more gradients. As a result, the embodiments disclosed herein may have a technical advantage of enabling the user to take photographs in varying lighting, shadow, or environmental conditions with real-time or near-real time performance as a lightweight machine-learning model is used for illumination correction, which may be capable to run near-real time on the smartphone or low-computation camera device.

Figure 22:
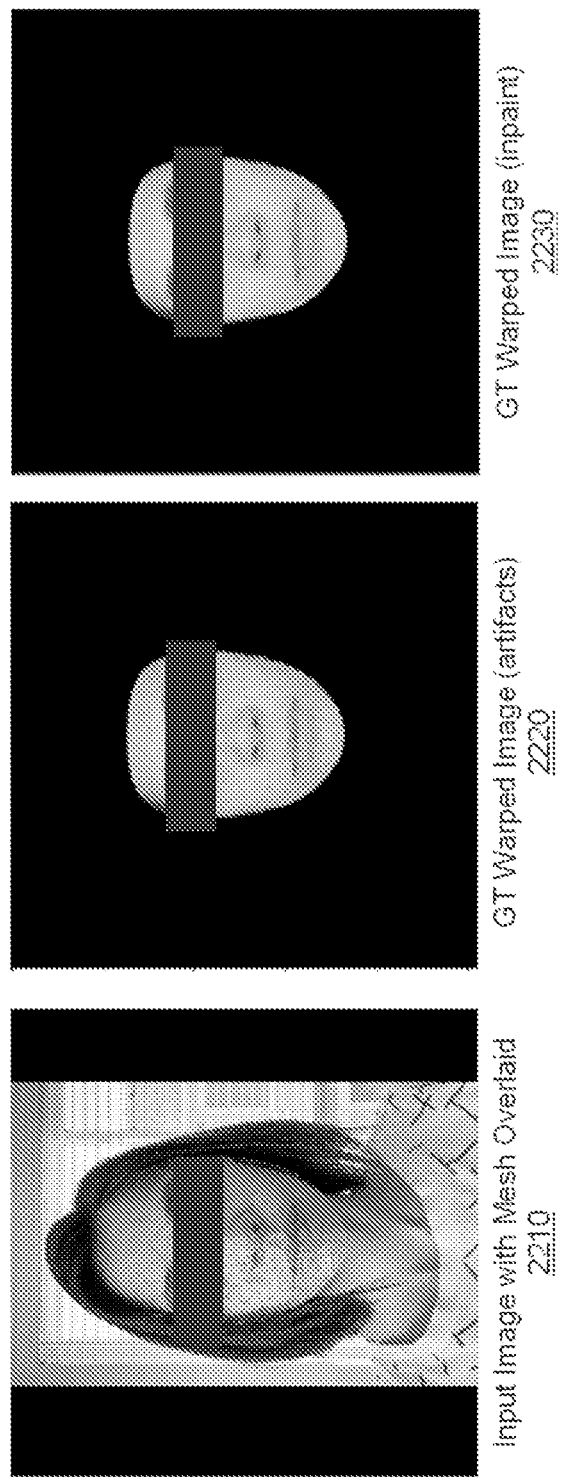
FIG. 22 illustrates an example mesh warping of an image.

Our method of data-collection provides us with high quality and high detail data; however, these images are not aligned. Most supervised machine-learning models may operate on aligned images using pixel-wise loss functions. In order to do a pixel-wise loss with unaligned in-the-wild images collected by the embodiments disclosed herein, one may be required to use some methods for aligning and warping the images to make them perfectly pixel-wise aligned. One example method may include mesh warping a source image to match a target image. In particular embodiments, the mesh may be generated using the facial landmarks. To perform the mesh warping process, an affine transformation may be calculated for each triangle in the mesh from the ground-truth to the input and each triangle may be individually applied using the affine transformation matrix. FIG. 22 illustrates an example mesh warping of an image. FIG. 22 shows the input image with mesh overlaid 2210. The resulting ground-truth (GT) warped image (artifacts) 2220 may have some artifacts where the transformation may leave some black or darker pixels around the edges of the warped triangles. To rectify this, one may use some inpainting methods to smooth out the areas around the edges of each triangle face, which results in a ground-truth (GT) warped image (inpaint) 2230. As may be seen, using mesh warping may be not ideal because it may cause significant loss of quality in the warped image and smoothing may be required in order to be able to do a pixel-wise comparison.

Figure 23:
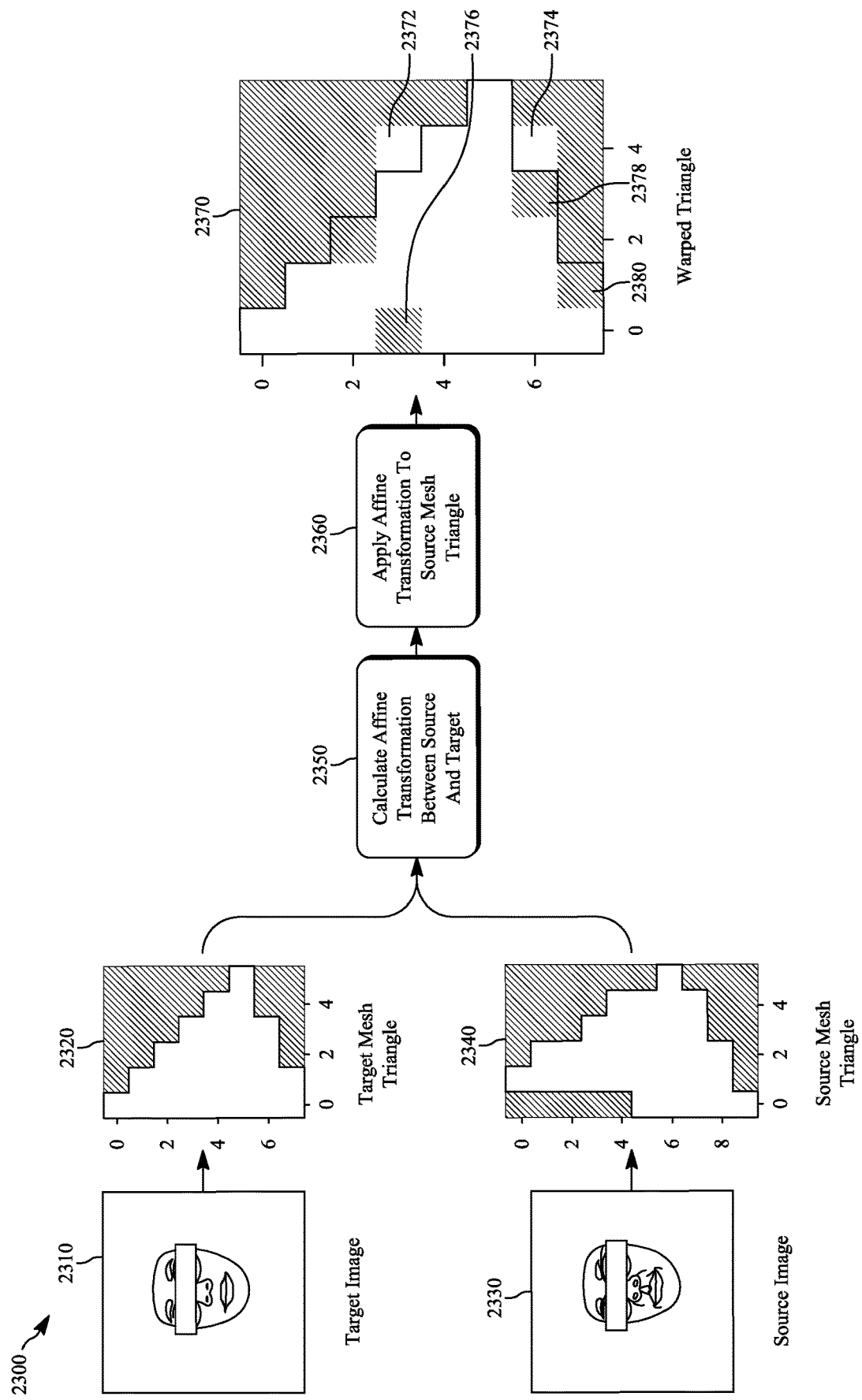
FIG. 23 illustrates an example flow diagram highlighting the issue of the mesh warping process.

FIG. 23 illustrates an example flow diagram 2300 highlighting the issue of the mesh warping process in the case where the source mesh triangles and the target mesh triangles are not perfectly aligned. The target image 2310 may be processed to generate a target mesh triangle 2320. The source image 2330 may be processed to generate a source mesh triangle 2340. Both the target mesh triangle 2320 and the source mesh triangle 2340 may be used to calculate affine transformation between source and target at step 2350. At step 2360, an affine transformation may be applied to the source mesh triangle essentially warping it to produce 2370 such that the warped source mesh triangle vertices correspond to the vertices of target mesh triangle. As may be seen, unit 2372 and unit 2374 went outside the boundary and unit 2376, unit 2378, and unit 2380 went inside the boundary, indicating poor edge condition.

Figure 24:
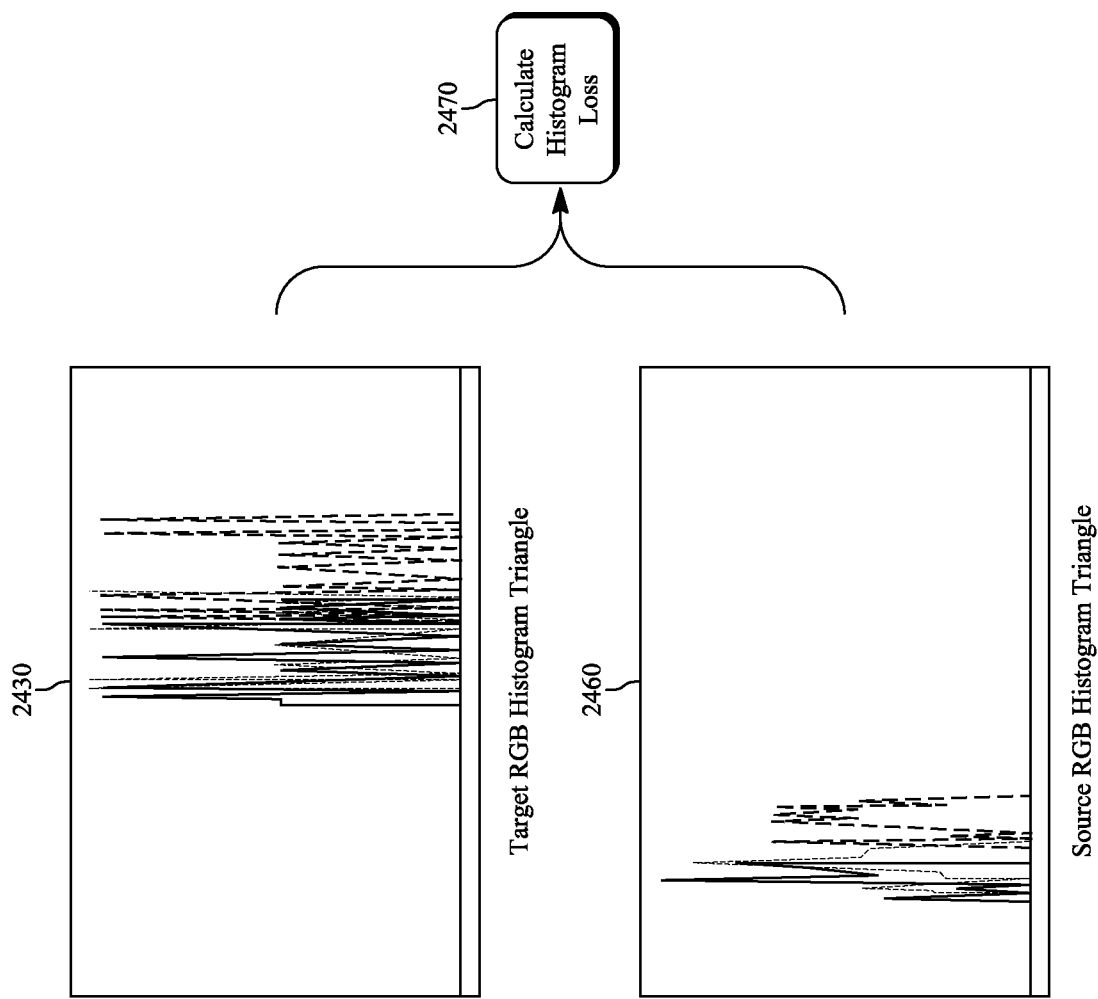
FIG. 24 illustrates an example flow diagram for determining the mesh loss.

Given the aforementioned issues of warping to use pixel-wise loss, in order to make the machine-learning model operate on the in-the-wild un-aligned images, the embodiments disclosed herein formulate a mesh loss function mentioned at step 2120 in FIG. 21 that works on un-aligned data. In particular embodiments, the mesh loss function may operate on un-aligned images by comparing the distribution of color in regions of the face rather than per pixel. The embodiments disclosed herein may use any images that have the similar but un-aligned facial landmarks and mesh estimates and compute the mesh loss based on color histograms (e.g., RGB) of each triangle face. For each sample, the loss may be the sum histogram loss or divergence between each triangle. FIG. 24 illustrates an example flow diagram 2400 for determining the mesh loss. The target image 2410 may be processed to generate a target mesh triangle 2420 as outlined in FIG. 13. The target mesh triangle 2420 may be processed to generate the target RGB histogram triangle 2430. The source image 2440 may be processed to generate a source mesh triangle 2450. The source mesh triangle 2450 may be processed to generate the source RGB histogram triangle 2460. Both the target RGB histogram triangle 2430 and the source RGB histogram triangle 2460 may be used to calculate the histogram loss at step 2470. As an example and not by way of limitation, the histogram loss may be KL divergence, JS divergence, earth movers distance, cosine similarity, etc. The mesh loss function that compares the distribution of color in regions of a face rather than per pixel may be an effective solution for addressing the technical challenge of developing a machine-learning model that can effectively operate on un-aligned images as the mesh loss operates on the distribution of pixel values present in the mesh, thereby solving the issue caused by pixel-wise losses on warped meshes. This enables us to work on un-aligned images.

Figure 25:
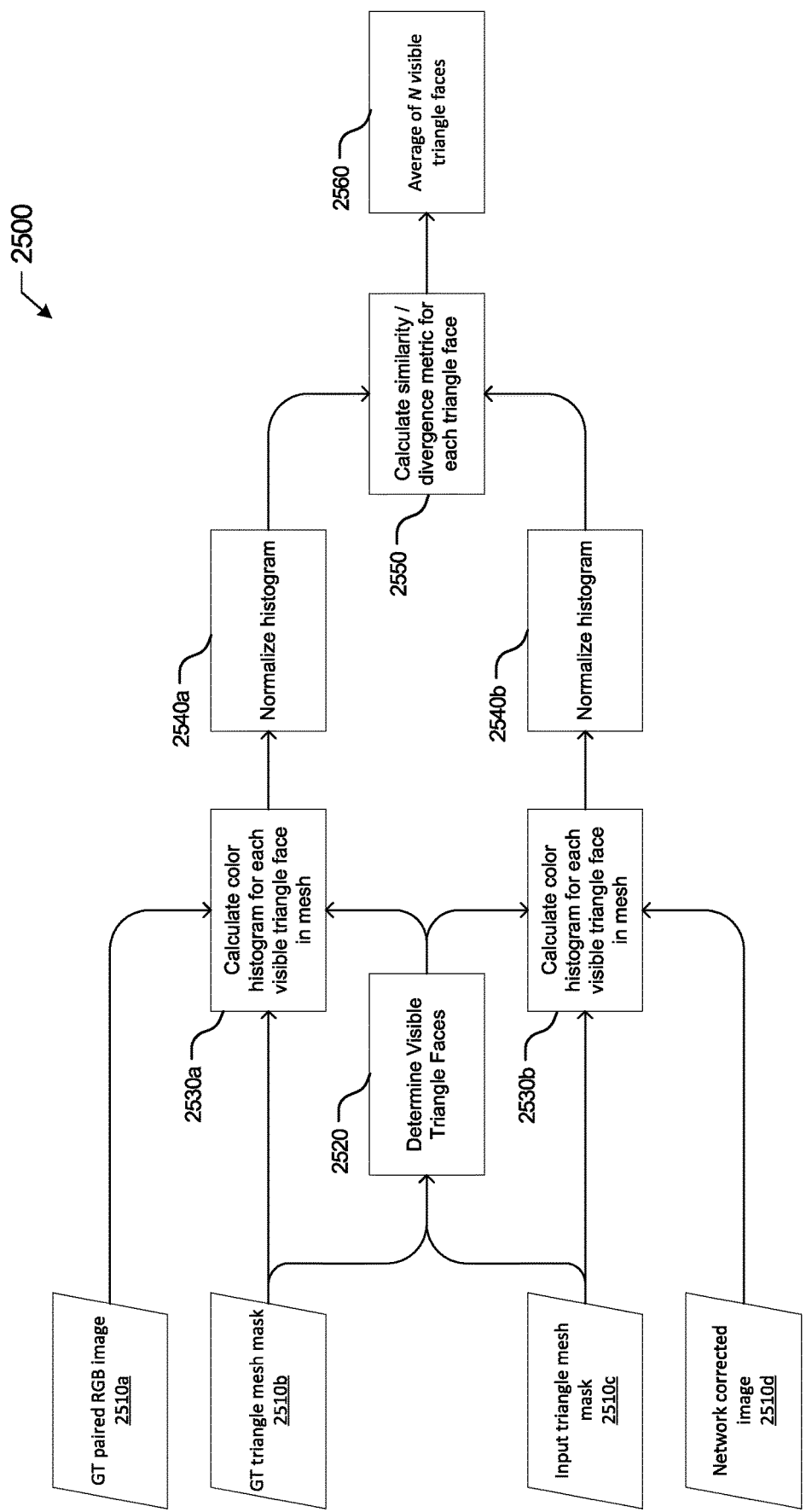
FIG. 25 illustrates an example flow diagram for calculating the mesh loss.

FIG. 25 illustrates an example flow diagram 2500 for calculating the mesh loss. The flow diagram 2500 may be used for the in-the-wild dataset collected by the embodiments disclosed herein. To begin with, the electronic device 100 may access the ground-truth (GT) paired RGB image 2510a, the ground-truth (GT) triangle mesh mask 2510b, the input triangle mesh mask 2510c, and the network corrected image 2530d. At step 2520, the electronic device 100 may determine triangle faces that are visible in both the ground-truth triangle mesh mask 2510b and the input triangle mesh mask 2510c. At step 2530a, the electronic device 100 may calculate color (e.g., RGB) histogram for each visible triangle face in the mesh based on the ground-truth paired RGB image 2510a and the ground-truth triangle mesh mask 2510b. At step 2530b, the electronic device 100 may calculate color (e.g., RGB) histogram for each visible triangle face in the mesh based on the input triangle mesh mask 2510c and network corrected image 2510d. At step 2540a/b, the electronic device 100 may normalize the histogram. At step 2550, the electronic device 100 may calculate the similarity or divergence metric for each triangle face. At step 2560, the electronic device 100 may determine the average of N visible triangle faces.

Figure 26:
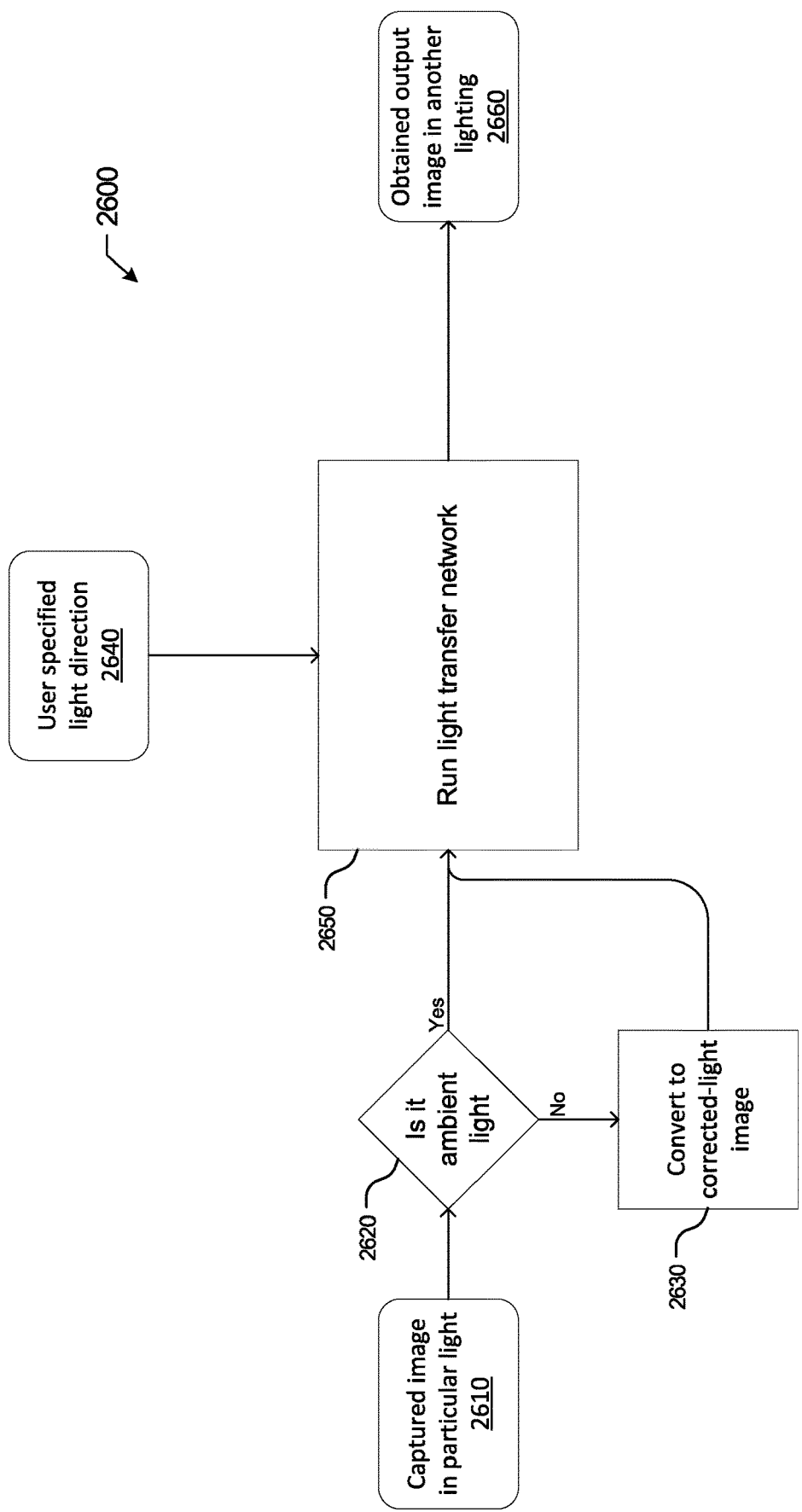
FIG. 26 illustrates an example flow diagram for generating an image in another illumination based on user specification.

In alternative embodiments, instead of correcting the illumination of an image, the electronic device 100 may enable a user to add a new type of illumination on the image. In particular embodiments, the electronic device 100 may determine the first, second, or third correction algorithm based on a user-specified/provided illumination. The electronic device 100 may provide different illumination outputs for the image. In particular embodiments, the corrected illumination may be based on the user-specified illumination. For the alternative embodiments, the electronic device 100 may re-use the core correction network 2000 illustrated in FIG. 20 but learns how to apply the new type of lighting/illumination. FIG. 26 illustrates an example flow diagram 2600 for generating an image in another illumination based on user specification. The electronic device 100 may access a captured image in particular light 2610. At step 2620, the electronic device 100 may determine whether it is illuminated by ambient light. If it is illuminated by ambient light, the image 2610 may be provided as an input to a light transfer network. If it is not illuminated by ambient light, the electronic device 100 may convert the image to a corrected-light image 2630 using the correction network 2000 illustrated in FIG. 20. At step 2650, the electronic device 100 may run a light transfer network based on the image 2610 or corrected-light image and a user specified light direction 2640. The output of the light transfer network may be the obtained output image in another lighting 2660. As a result, the embodiments disclosed herein may have a technical advantage of relighting a photograph captured in a particular environment illumination into another environment illumination to create a different type of look on the photograph as a user may specify an illumination that is then used for image relighting.

Figure 27:
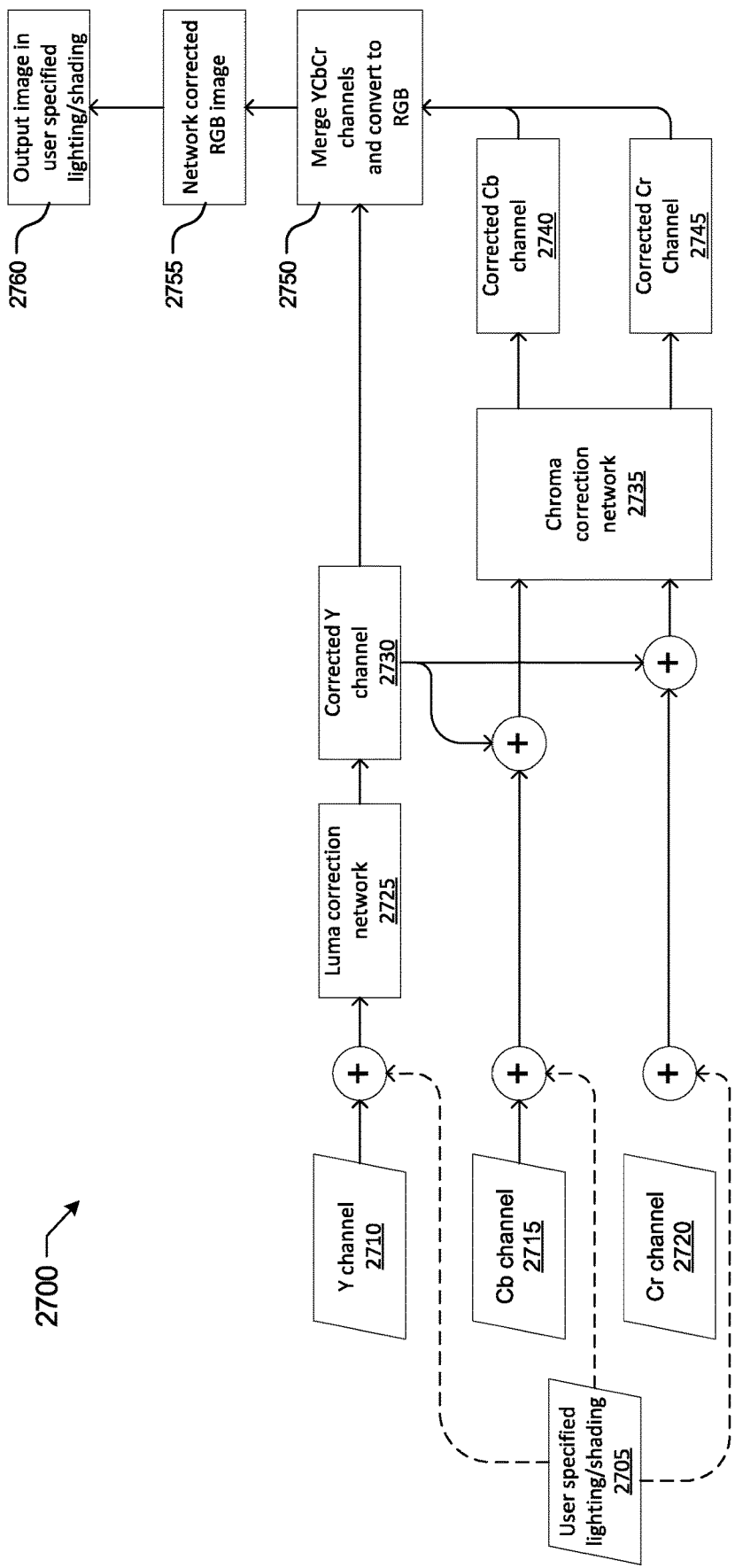
FIG. 27 illustrates an example architecture of the light transfer network.

FIG. 27 illustrates an example architecture 2700 of the light transfer network. The example architecture 2700 may be based on the assumption that the input image has been captured in ambient lighting. The user specified lighting/shading 2705 may be combined with the Y channel 2710, Cb channel 2715, and Cr channel 2720, respectively. The combination of the user specified lighting/shading and Y channel may be input to the luma correction network 2725, which outputs the corrected Y channel 2730. The corrected Y channel 2720 may be further combined with the combination of the user specified lighting/shading 2705 and the Cb channel 2715, which may be then input to the chroma correction network 2735. In particular embodiments, the chroma correction network 2735 may be separate or joint for Cb/Cr channels. The corrected Y channel 2720 may be also combined with the combination of the user specified lighting/shading 2705 and the Cr channel 2720, which may be then input to the chroma correction network 2735. The chroma correction network 2735 may output the corrected Cb channel 2740 and the corrected Cr channel 2745. At step 2750, the electronic device 100 may merge YCbCr channels and convert the merged results to an RGB image. At step 2755, the electronic device 100 may generate a network corrected RGB image. At step 2760, the electronic device 100 may output image in user specified lighting/shading.

Figure 28:
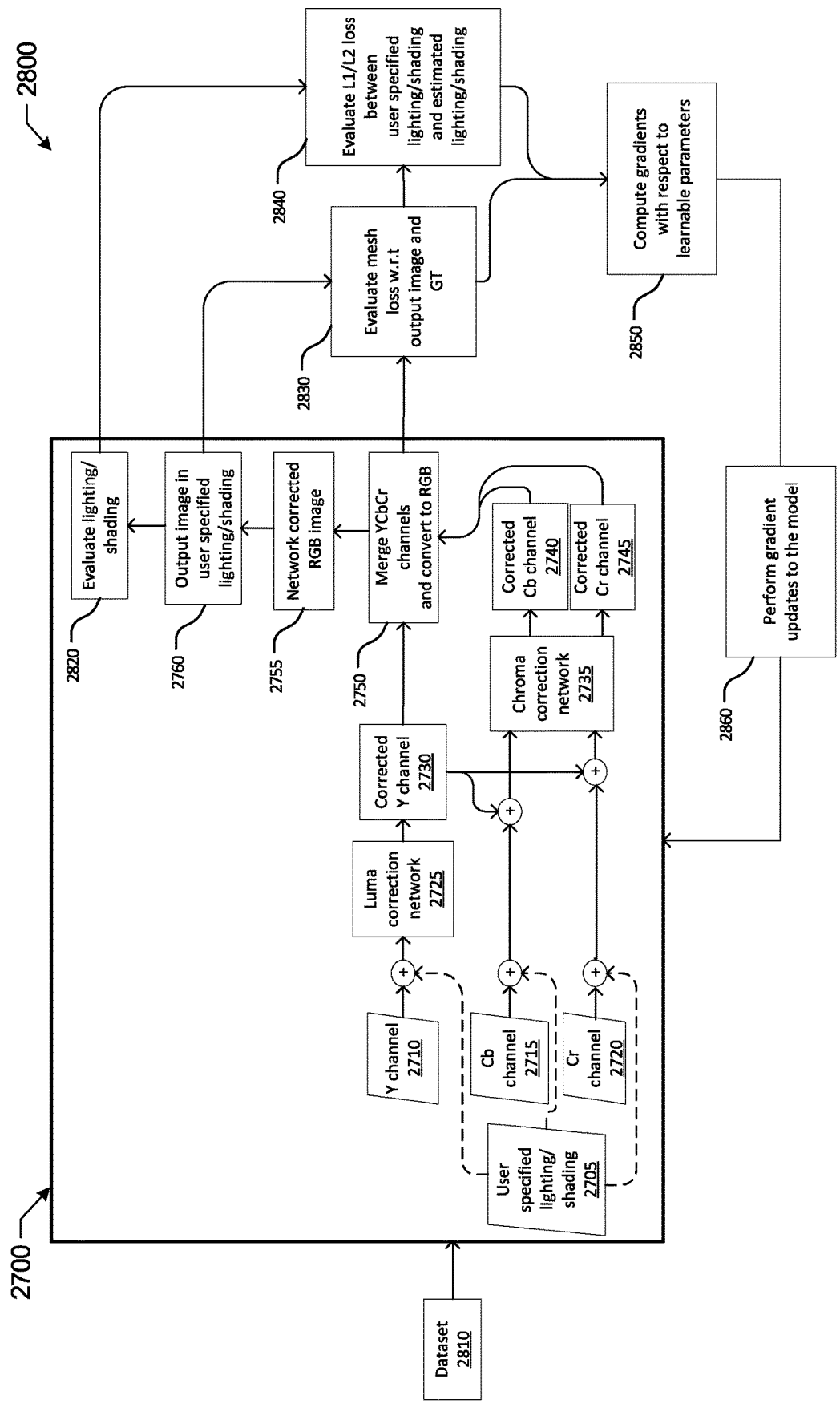
FIG. 28 illustrates an example end-to-end training of the light transfer network.

FIG. 28 illustrates an example end-to-end training 2800 of the light transfer network. The in-the-wild dataset 2810 collected as described previously may be input to the machine-learning model based on the architecture 2700. Compared to the architecture 2700, there may be an additional step 2820, where the electronic device 100 may estimate the lighting/shading in the output image. At step 2830, the electronic device 100 may evaluate the mesh loss with respect to the output image and the ground-truth. At step 2840, the electronic device 100 may evaluate L1/L2 loss between the user specified lighting/shading and the estimated lighting/shading of the output image. At step 2850, the electronic device 100 may compute gradients with respect to learnable parameters. At step 2860, the electronic device 100 may perform gradient updates to the machine-learning model.

Figure 29:
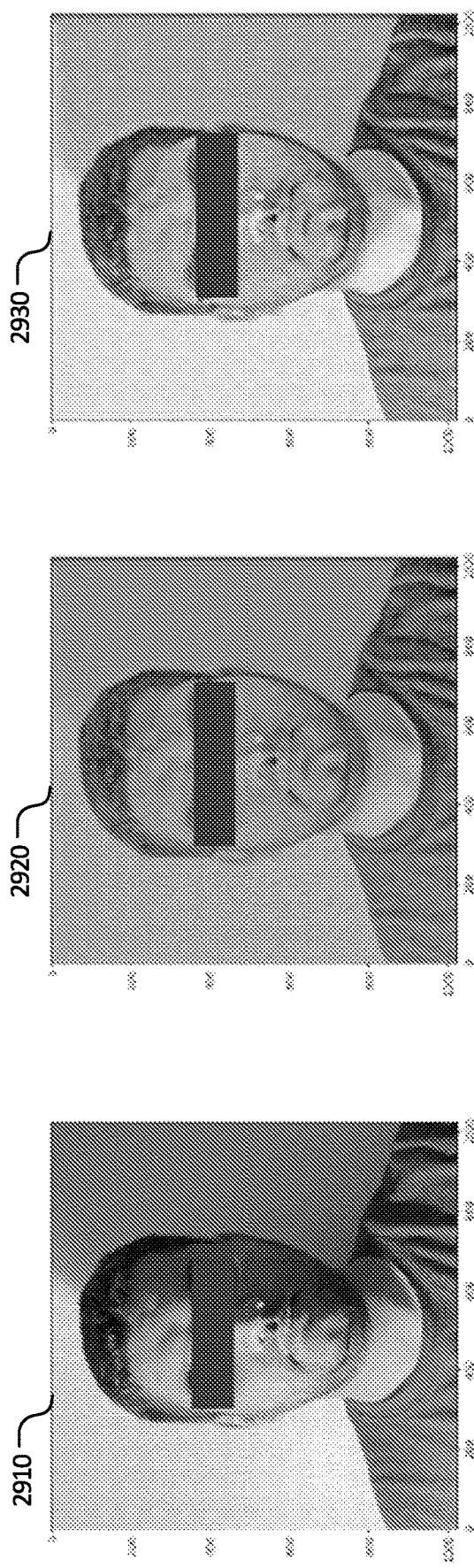
FIG. 29 illustrates example experimental results for illumination correction.

FIG. 29 illustrates example experimental results for illumination correction. The embodiments disclosed herein perform initial experiments for using shading as a prior for relighting/correcting an image. As one may see from FIG. 29, there may be a shadow on the right half of the input image 2910 initially. The relighted image 2920 shows that the shadow gets corrected and the details not visible in the captured image 2910 are recovered. The relighted image 2930 shows using histogram matching (standard image processing) on the relight image output.

The embodiments disclosed herein may have a technical advantage of modeling different illumination variations to correct a photograph taken in poor illumination, including compensating for seemingly lost detail in poorly lit regions of the image, recovering the details present in the shadows or over-exposed areas of the image, handling foreign shadows, computationally correcting the photograph as if it was captured in studio lights, etc. The embodiments disclosed herein may correct any illumination variation in photographs captured by smartphone camera or any other camera-based device. The way the lightweight machine-learning model works is by learning the correction instead of the corrected output, which may make it feasible to model many types of per-pixel corrections. The embodiments disclosed herein may be applied to a variety of use cases. One use case may include consumer electronics including smartphone cameras, portable camera systems, digital single-lens reflex cameras, etc. For example, lightweight image relighting as disclosed herein may have applications in areas such as portrait modes in camera, removing shadow, adding new directional fill-lights, etc. As another example, the embodiments disclosed herein may be beneficial for content creation and putting a film-studio in a smartphone. Another use case may include software/services including controlling illumination, shadows, etc. in a lightweight setting to further develop photo-editing software/services for smartphone, laptop, etc. Such software/services may be showcased in public places (e.g., shopping malls), where users can visualize the impact of different lighting or change their current lighting in order to check out a garment/outfit. Another use case may include privacy protection, where the embodiments disclosed herein may deliver a corrected output on the device due to the lightweight machine-learning model. This may protect users' privacy since the data is not transmitted to servers or any cloud. Another use case may include data acquisition for machine learning as our method of data-capturing in the wild may be applied to all types of machine-learning tasks, where the correction operator is learned in a machine-learning model instead of creating/hallucinating/generating the corrected output image. The in-the-wild data collection process as disclosed herein may be used to create quick and large datasets and may greatly benefit the machine-learning community.

Figure 30:
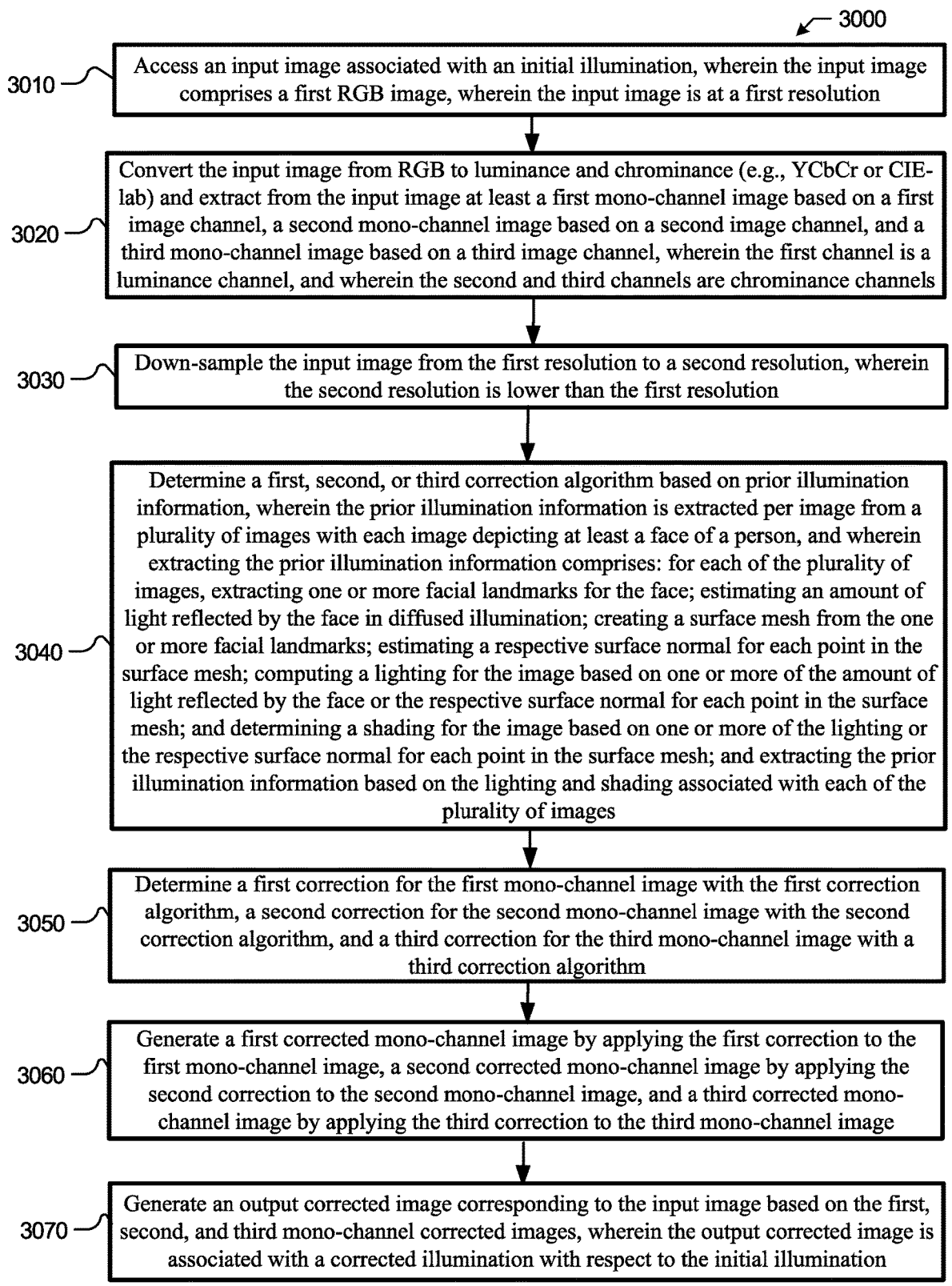
FIG. 30 illustrates an example method for image illumination control, in accordance with the presently disclosed embodiments.

FIG. 30 illustrates is a flow diagram of a method 3000 for image illumination control, in accordance with the presently disclosed embodiments. The method 3000 may be performed utilizing one or more processing devices (e.g., the electronic device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 3000 may begin at step 3010 with the one or more processing devices (e.g., the electronic device 100). For example, in particular embodiments, the electronic device 100 may access an input image associated with an initial illumination, wherein the input image comprises a first RGB image, wherein the input image is at a first resolution. The method 3000 may then continue at step 3020 with the one or more processing devices (e.g., the electronic device 100). In particular embodiments, the electronic device 100 may convert the input image from RGB to luminance and chrominance (e.g., YCbCr or CIE-lab). In particular embodiments, the electronic device 100 may extract from the converted image at least a first mono-channel image based on a first image channel, a second mono-channel image based on a second image channel, and a third mono-channel based on a third image channel, wherein the first channel is a luminance channel, and wherein the second and third channels are chrominance channels. The method 3000 may then continue at step 3030 with the one or more processing devices (e.g., the electronic device 100). For example, in particular embodiments, the electronic device 100 may down-sample the input image from the first resolution to a second resolution, wherein the second resolution is lower than the first resolution. The method 3000 may then continue at block 3040 with the one or more processing devices (e.g., the electronic device 100). For example, in particular embodiments, the electronic device 100 may determine a first, second, or third correction algorithm based on prior illumination information, wherein the prior illumination information is extracted per image from a plurality of images with each image depicting at least a face of a person, and wherein extracting the prior illumination information comprises: for each of the plurality of images, extracting one or more facial landmarks for the face; estimating an amount of light reflected by the face; creating a surface mesh from the one or more facial landmarks; estimating a respective surface normal for each point in the surface mesh; computing a lighting for the image based on one or more of the amount of light reflected by the face or the respective surface normal for each point in the surface mesh; and determining a shading for the image based on one or more of the lighting or the respective surface normal for each point in the surface mesh; and extracting the prior illumination information based on the lighting and shading associated with each of the plurality of images. It should be noted that although the above describes computing prior illumination information for training images while training the correction algorithms, computing prior illumination information may be performed for each image at testing time or during deployment. The method 3000 may then continue at step 3050 with the one or more processing devices (e.g., the electronic device 100). For example, in particular embodiments, the electronic device 100 may determine a first correction for the first mono-channel image with the first correction algorithm, a second correction for the second mono-channel image with the second correction algorithm, and a third correction for the third mono-channel image with the third correction algorithm. The method 3000 may then continue at step 3060 with the one or more processing devices (e.g., the electronic device 100). For example, in particular embodiments, the electronic device 100 may generate a first corrected mono-channel image by applying the first correction to the first mono-channel image, a second corrected mono-channel image by applying the second correction to the second mono-channel image, and a third corrected mono-channel image by applying the third correction to the third mono-channel image. The method 3000 may then continue at step 3070 with the one or more processing devices (e.g., the electronic device 100). For example, in particular embodiments, the electronic device 100 may generate an output corrected image corresponding to the input image based on the first, second, and third mono-channel corrected images, wherein the output corrected image is associated with a corrected illumination with respect to the initial illumination. In particular embodiments, the electronic device 100 may further convert back to RGB after assembling the three corrected channels of luminance and chrominance. Particular embodiments may repeat one or more steps of the method of FIG. 30, where appropriate. Although this disclosure describes and illustrates particular steps of the method of FIG. 30 as occurring in a particular order, this disclosure contemplates any suitable steps of the method of FIG. 30 occurring in any suitable order. Moreover, although this disclosure describes and illustrates an example method for image illumination control including the particular steps of the method of FIG. 30, this disclosure contemplates any suitable method for image illumination control including any suitable steps, which may include all, some, or none of the steps of the method of FIG. 30, where appropriate. Furthermore, although this disclosure describes and illustrates particular components, devices, or systems carrying out particular steps of the method of FIG. 30, this disclosure contemplates any suitable combination of any suitable components, devices, or systems carrying out any suitable steps of the method of FIG. 30.

Systems and Methods

Figure 31:
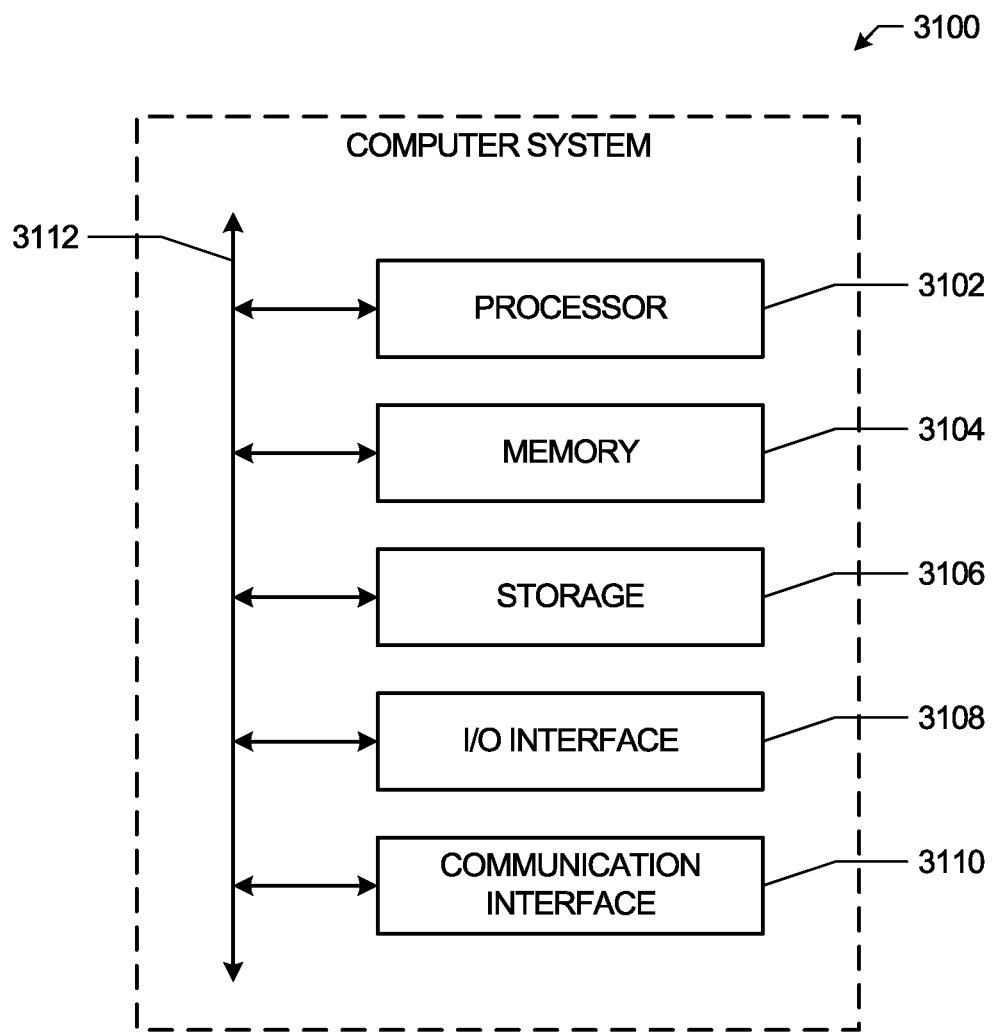
FIG. 31 illustrates an example computer system.

FIG. 31 illustrates an example computer system 3100 that may be utilized to perform image illumination control, in accordance with the presently disclosed embodiments. In particular embodiments, one or more computer systems 3100 perform one or more steps of one or more methods described or illustrated herein. In particular embodiments, one or more computer systems 3100 provide functionality described or illustrated herein. In particular embodiments, software running on one or more computer systems 3100 performs one or more steps of one or more methods described or illustrated herein or provides functionality described or illustrated herein. Particular embodiments include one or more portions of one or more computer systems 3100. Herein, reference to a computer system may encompass a computing device, and vice versa, where appropriate. Moreover, reference to a computer system may encompass one or more computer systems, where appropriate.

This disclosure contemplates any suitable number of computer systems 3100. This disclosure contemplates computer system 3100 taking any suitable physical form. As example and not by way of limitation, computer system 3100 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 3100 may include one or more computer systems 3100; be unitary or distributed; span multiple locations; span multiple machines; span multiple data centers; or reside in a cloud, which may include one or more cloud components in one or more networks.

Where appropriate, one or more computer systems 3100 may perform without substantial spatial or temporal limitation one or more steps of one or more methods described or illustrated herein. As an example, and not by way of limitation, one or more computer systems 3100 may perform in real time or in batch mode one or more steps of one or more methods described or illustrated herein. One or more computer systems 3100 may perform at different times or at different locations one or more steps of one or more methods described or illustrated herein, where appropriate.

In particular embodiments, computer system 3100 includes a processor 3102, memory 3104, storage 3106, an input/output (I/O) interface 3108, a communication interface 3110, and a bus 3112. Although this disclosure describes and illustrates a particular computer system having a particular number of particular components in a particular arrangement, this disclosure contemplates any suitable computer system having any suitable number of any suitable components in any suitable arrangement. In particular embodiments, processor 3102 includes hardware for executing instructions, such as those making up a computer program. As an example, and not by way of limitation, to execute instructions, processor 3102 may retrieve (or fetch) the instructions from an internal register, an internal cache, memory 3104, or storage 3106; decode and execute them; and then write one or more results to an internal register, an internal cache, memory 3104, or storage 3106. In particular embodiments, processor 3102 may include one or more internal caches for data, instructions, or addresses. This disclosure contemplates processor 3102 including any suitable number of any suitable internal caches, where appropriate. As an example, and not by way of limitation, processor 3102 may include one or more instruction caches, one or more data caches, and one or more translation lookaside buffers (TLBs). Instructions in the instruction caches may be copies of instructions in memory 3104 or storage 3106, and the instruction caches may speed up retrieval of those instructions by processor 3102.

Data in the data caches may be copies of data in memory 3104 or storage 3106 for instructions executing at processor 3102 to operate on; the results of previous instructions executed at processor 3102 for access by subsequent instructions executing at processor 3102 or for writing to memory 3104 or storage 3106; or other suitable data. The data caches may speed up read or write operations by processor 3102. The TLBs may speed up virtual-address translation for processor 3102. In particular embodiments, processor 3102 may include one or more internal registers for data, instructions, or addresses. This disclosure contemplates processor 3102 including any suitable number of any suitable internal registers, where appropriate. Where appropriate, processor 3102 may include one or more arithmetic logic units (ALUs); be a multi-core processor; or include one or more processors 3102. Although this disclosure describes and illustrates a particular processor, this disclosure contemplates any suitable processor.

In particular embodiments, memory 3104 includes main memory for storing instructions for processor 3102 to execute or data for processor 3102 to operate on. As an example, and not by way of limitation, computer system 3100 may load instructions from storage 3106 or another source (such as, for example, another computer system 3100) to memory 3104. Processor 3102 may then load the instructions from memory 3104 to an internal register or internal cache. To execute the instructions, processor 3102 may retrieve the instructions from the internal register or internal cache and decode them. During or after execution of the instructions, processor 3102 may write one or more results (which may be intermediate or final results) to the internal register or internal cache. Processor 3102 may then write one or more of those results to memory 3104. In particular embodiments, processor 3102 executes only instructions in one or more internal registers or internal caches or in memory 3104 (as opposed to storage 3106 or elsewhere) and operates only on data in one or more internal registers or internal caches or in memory 3104 (as opposed to storage 3106 or elsewhere).

One or more memory buses (which may each include an address bus and a data bus) may couple processor 3102 to memory 3104. Bus 3112 may include one or more memory buses, as described below. In particular embodiments, one or more memory management units (MMUs) reside between processor 3102 and memory 3104 and facilitate accesses to memory 3104 requested by processor 3102. In particular embodiments, memory 3104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 3104 may include one or more memory devices 3104, where appropriate. Although this disclosure describes and illustrates particular memory, this disclosure contemplates any suitable memory.

In particular embodiments, storage 3106 includes mass storage for data or instructions. As an example, and not by way of limitation, storage 3106 may include a hard disk drive (HDD), a floppy disk drive, flash memory, an optical disc, a magneto-optical disc, magnetic tape, or a Universal Serial Bus (USB) drive or a combination of two or more of these. Storage 3106 may include removable or non-removable (or fixed) media, where appropriate. Storage 3106 may be internal or external to computer system 3100, where appropriate. In particular embodiments, storage 3106 is non-volatile, solid-state memory. In particular embodiments, storage 3106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3106 taking any suitable physical form. Storage 3106 may include one or more storage control units facilitating communication between processor 3102 and storage 3106, where appropriate. Where appropriate, storage 3106 may include one or more storages 3106. Although this disclosure describes and illustrates particular storage, this disclosure contemplates any suitable storage.

In particular embodiments, I/O interface 3108 includes hardware, software, or both, providing one or more interfaces for communication between computer system 3100 and one or more I/O devices. Computer system 3100 may include one or more of these I/O devices, where appropriate. One or more of these I/O devices may enable communication between a person and computer system 3100. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3106 for them. Where appropriate, I/O interface 3108 may include one or more device or software drivers enabling processor 3102 to drive one or more of these I/O devices. I/O interface 3108 may include one or more I/O interfaces 3106, where appropriate. Although this disclosure describes and illustrates a particular I/O interface, this disclosure contemplates any suitable I/O interface.

In particular embodiments, communication interface 3110 includes hardware, software, or both providing one or more interfaces for communication (such as, for example, packet-based communication) between computer system 3100 and one or more other computer systems 3100 or one or more networks. As an example, and not by way of limitation, communication interface 3110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3110 for it.

As an example, and not by way of limitation, computer system 3100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 3100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3100 may include any suitable communication interface 3110 for any of these networks, where appropriate. Communication interface 3110 may include one or more communication interfaces 3110, where appropriate. Although this disclosure describes and illustrates a particular communication interface, this disclosure contemplates any suitable communication interface.

In particular embodiments, bus 3112 includes hardware, software, or both coupling components of computer system 3100 to each other. As an example, and not by way of limitation, bus 3112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3112 may include one or more buses 3112, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
   accessing an input image associated with an initial illumination;
   extracting from the input image at least a first mono-channel image based on a first image channel, a second mono-channel image based on a second image channel, and a third mono-channel image based on a third image channel;
   determining a first correction for the first mono-channel image with a first correction algorithm, a second correction for the second mono-channel image with a second correction algorithm, and a third correction for the third mono-channel image with a third correction algorithm;
   generating a first corrected mono-channel image by applying the first correction to the first mono-channel image, a second corrected mono-channel image by applying the second correction to the second mono-channel image, and a third corrected mono-channel image by applying the third correction to the third mono-channel image; and
   generating an output corrected image corresponding to the input image based on the first, second, and third mono-channel corrected images, wherein the output corrected image is associated with a corrected illumination with respect to the initial illumination.

2. The method of claim 1, further comprising:
   determining the first, second correction, or third algorithm based on prior illumination information, wherein the prior illumination information is extracted per image from a plurality of images with each image depicting at least a face of a person, and wherein extracting the prior illumination information comprises:
   for each of the plurality of images,
     extracting one or more facial landmarks for the face;
     estimating an amount of light reflected by the face in diffused illumination;
     creating a surface mesh from the one or more facial landmarks;
     estimating a respective surface normal for each point in the surface mesh;
     computing a lighting for the image based on one or more of the amount of light reflected by the face or the respective surface normal for each point in the surface mesh; and
     determining a shading for the image based on one or more of the lighting or the respective surface normal for each point in the surface mesh; and
   extracting the prior illumination information based on the lighting and shading associated with each of the plurality of images.

3. The method of claim 2, further comprising:
   computing one or more gradients with respect to one or more parameters associated with the first, second, or third correction algorithm based on a mesh loss function, wherein the mesh loss function operates on two un-aligned training images by comparing a color distribution in one or more regions of the face depicted in each of the two images; and
   updating the first, second, or third correction algorithm based on the one or more gradients.

4. The method of claim 1, wherein the corrected illumination is based on a user-specified illumination, wherein the method further comprises:
   determining the first, second, or third correction algorithm based on the user-specified illumination.

5. The method of claim 1, wherein the input image comprises a first RGB image, wherein the method further comprises:
   converting the first RGB image from RGB color space to a luminance and chrominance color space, wherein the first channel is a luminance channel, and wherein the second and third channels are chrominance channels.

6. The method of claim 5, further comprising:
   using chroma compressibility to generate a lightweight neural-network architecture based on the luminance channel and chrominance channels, wherein the luminance channel is associated with high level of detail and the lightweight neural-network architecture for correcting the luminance channel has a greater number of parameters, wherein the chrominance channels are associated with low level of detail, and is a compressible color representation, and the lightweight neural-network architecture for correcting the chrominance channels has fewer number of parameters; and
   learning a luminance correction and a chrominance correction, wherein learning the chrominance correction has fewer number of corrections or parameters than learning the luminance correction.

7. The method of claim 5, wherein generating the output corrected image corresponding to the input image based on the first, second, and third mono-channel corrected images comprises:
   generating an assembled image by assembling the first, second, and third mono-channel corrected images; and
   converting the assembled image to a second RGB image, wherein the output correct image is the second RGB image.

8. The method of claim 1, wherein the input image is at a first resolution, wherein the method further comprises:
   down-sampling the input image from the first resolution to a second resolution, wherein the second resolution is lower than the first resolution.

9. The method of claim 8, further comprising:
   applying an illumination correction on the input image at the first resolution by interpolating corrections from the second resolution to the first resolution, wherein the illumination correction is learnt on the input image at the second resolution.

10. The method of claim 1, further comprising capturing in-the-wild illumination data, wherein the capturing comprises:

setting up an environment based on filtered or diffuse lighting from a first source and blocking lighting from one or more second sources or any similarly controlled environment with diffuse lighting to generate ground truth;

collecting input data based on environment with varied lighting;

capturing the in-the-wild illumination data based on one or more cameras comprising one or more of a camera placed in a tripod or a camera held in hand; and processing the captured data by pairing each image of the captured data with closest matching ground-truth image of the ground truth and extracting prior illumination information and mesh masks from both images.

11. An electronic device comprising:

one or more displays;

one or more non-transitory computer-readable storage media including instructions; and one or more processors coupled to the storage media, the one or more processors configured to execute the instructions to:

access an input image associated with an initial illumination;

extract from the input image at least a first mono-channel image based on a first image channel, a second mono-channel image based on a second image channel, and a third mono-channel image based on a third image channel;

determine a first correction for the first mono-channel image with a first correction algorithm, a second correction for the second mono-channel image with a second correction algorithm, and a third correction for the third mono-channel image with a third correction algorithm;

generate a first corrected mono-channel image by applying the first correction to the first mono-channel image, a second corrected mono-channel image by applying the second correction to the second mono-channel image, and a third corrected mono-channel image by applying the third correction to the third mono-channel image; and generate an output corrected image corresponding to the input image based on the first, second, and third mono-channel corrected images, wherein the output corrected image is associated with a corrected illumination with respect to the initial illumination.

12. The electronic device of claim 11, wherein the processors are further configured to execute the instructions to:

determine the first, second correction, or third algorithm based on prior illumination information, wherein the prior illumination information is extracted per image from a plurality of images with each image depicting at least a face of a person, and wherein extracting the prior illumination information comprises:

for each of the plurality of images, extracting one or more facial landmarks for the face;

estimating an amount of light reflected by the face in diffused illumination;

creating a surface mesh from the one or more facial landmarks;

estimating a respective surface normal for each point in the surface mesh;

computing a lighting for the image based on one or more of the amount of light reflected by the face or the respective surface normal for each point in the surface mesh; and determining a shading for the image based on one or more of the lighting or the respective surface normal for each point in the surface mesh; and extract the prior illumination information based on the lighting and shading associated with each of the plurality of images.

13. The electronic device of claim 12, wherein the processors are further configured to execute the instructions to:

compute one or more gradients with respect to one or more parameters associated with the first, second, or third correction algorithm based on a mesh loss function, wherein the mesh loss function operates on two un-aligned training images by comparing a color distribution in one or more regions of the face depicted in each of the two images; and update the first, second, or third correction algorithm based on the one or more gradients.

14. The electronic device of claim 11, wherein the corrected illumination is based on a user-specified illumination, wherein the processors are further configured to execute the instructions to:

determine the first, second, or third correction algorithm based on the user-specified illumination.

15. The electronic device of claim 11, wherein the input image comprises a first RGB image, wherein the processors are further configured to execute the instructions to:

convert the first RGB image from RGB color space to a luminance and chrominance color space, wherein the first channel is a luminance channel, and wherein the second and third channels are chrominance channels.

16. The electronic device of claim 11, wherein generating the output corrected image corresponding to the input image based on the first, second, and third mono-channel corrected images comprises:

generating an assembled image by assembling the first, second, and third mono-channel corrected images; and converting the assembled image to a second RGB image, wherein the output correct image is the second RGB image.

17. The electronic device of claim 11, wherein the input image is at a first resolution, wherein the processors are further configured to execute the instructions to:

down-sample the input image from the first resolution to a second resolution, wherein the second resolution is lower than the first resolution.

18. A computer-readable non-transitory storage media comprising instructions executable by a processor to:

access an input image associated with an initial illumination;

extract from the input image at least a first mono-channel image based on a first image channel, a second mono-channel image based on a second image channel, and a third mono-channel image based on a third image channel;

determine a first correction for the first mono-channel image with a first correction algorithm, a second correction for the second mono-channel image with a second correction algorithm, and a third correction for the third mono-channel image with a third correction algorithm;

generate a first corrected mono-channel image by applying the first correction to the first mono-channel image, a second corrected mono-channel image by applying the second correction to the second mono-channel image, and a third corrected mono-channel image by applying the third correction to the third mono-channel image; and generate an output corrected image corresponding to the input image based on the first, second, and third mono-channel corrected images, wherein the output corrected image is associated with a corrected illumination with respect to the initial illumination.

19. The media of claim 18, wherein the instructions are further executable by the processor to:
determine the first, second correction, or third algorithm based on prior illumination information, wherein the prior illumination information is extracted per image from a plurality of images with each image depicting at least a face of a person, and wherein extracting the prior illumination information comprises:
for each of the plurality of images,
   extracting one or more facial landmarks for the face;
   estimating an amount of light reflected by the face in diffused illumination;
   creating a surface mesh from the one or more facial landmarks;
   estimating a respective surface normal for each point in the surface mesh;
   computing a lighting for the image based on one or more of the amount of light reflected by the face or the respective surface normal for each point in the surface mesh; and
   determining a shading for the image based on one or more of the lighting or the respective surface normal for each point in the surface mesh; and
extract the prior illumination information based on the lighting and shading associated with each of the plurality of images.

20. The media of claim 19, wherein the instructions are further executable by the processor to:
compute one or more gradients with respect to one or more parameters associated with the first, second, or third correction algorithm based on a mesh loss function, wherein the mesh loss function operates on two un-aligned training images by comparing a color distribution in one or more regions of the face depicted in each of the two images; and
update the first, second, or third correction algorithm based on the one or more gradients.

21. The media of claim 18, wherein the corrected illumination is based on a user-specified illumination, wherein the instructions are further executable by the processor to:
determine the first or second correction algorithm based on the user-specified illumination.

22. The media of claim 18, wherein the input image comprises a first RGB image, wherein the instructions are further executable by the processor to:
convert the first RGB image from RGB color space to a luminance and chrominance color space, wherein the first channel is a luminance channel, and wherein the second and third channels are chrominance channels.

23. The media of claim 18, wherein generating the output corrected image corresponding to the input image based on the first, second, and third mono-channel corrected images comprises:
generating an assembled image by assembling the first, second, and third mono-channel corrected images; and
converting the assembled image to a second RGB image, wherein the output correct image is the second RGB image.

* * * * *